US006351467B1

(12) United States Patent
Dillon

(10) Patent No.: US 6,351,467 B1
(45) Date of Patent: Feb. 26, 2002

(54) SYSTEM AND METHOD FOR MULTICASTING MULTIMEDIA CONTENT

(75) Inventor: Douglas M. Dillon, Gaithersburg, MD (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/049,334

(22) Filed: Mar. 27, 1998

Related U.S. Application Data

(60) Provisional application No. 60/063,692, filed on Oct. 27, 1997.

(51) Int. Cl.$^7$ ............................. H04J 3/26; G06F 15/16
(52) U.S. Cl. ....................... 370/432; 709/219; 709/227
(58) Field of Search ................................ 370/390, 432, 370/389; 709/245, 227, 204, 217, 219

(56) References Cited

U.S. PATENT DOCUMENTS

| 5,293,250 A | | 3/1994 | Okumura et al. ............ 358/402 |
|---|---|---|---|
| 5,347,304 A | | 9/1994 | Moura et al. ................ 725/131 |
| 5,410,698 A | * | 4/1995 | Danneels et al. ........... 709/331 |
| 5,483,466 A | | 1/1996 | Kawahara et al. .......... 709/203 |
| 5,548,753 A | | 8/1996 | Linstead et al. ............... 707/1 |
| 5,557,320 A | | 9/1996 | Krebs ......................... 725/114 |
| 5,557,724 A | * | 9/1996 | Sampat et al. ................ 725/43 |
| 5,632,018 A | | 5/1997 | Otorii ......................... 709/200 |
| 5,680,551 A | | 10/1997 | Martino, II ................. 709/226 |
| 5,737,395 A | | 4/1998 | Irribarren ................. 379/88.13 |
| 5,740,230 A | | 4/1998 | Vaudreuil ................. 379/88.22 |
| 5,740,549 A | * | 4/1998 | Reilly et al. ................... 705/14 |
| 5,751,960 A | | 5/1998 | Matsunaga .................. 709/206 |
| 5,754,778 A | | 5/1998 | Shoujima .................... 709/206 |
| 5,774,664 A | * | 6/1998 | Hidary et al. ............... 725/110 |
| 5,790,790 A | | 8/1998 | Smith et al. ................. 709/206 |
| 5,893,091 A | * | 4/1999 | Hunt et al. ..................... 707/3 |
| 5,978,381 A | * | 11/1999 | Perlman et al. ............. 370/432 |
| 6,038,601 A | * | 3/2000 | Lambert et al. ............ 709/226 |
| 2001/0003828 A1 | * | 6/2001 | Peterson et al. ............ 709/219 |

OTHER PUBLICATIONS

P. Parnes, M. Mattsson, K. Synnes & D. Schefstrom, The MWEB Presentation Framework, 1997.
S. B. Weinstein, The Role of Satellites in Internet Multimedia Applications, Sep. 23, 1996.

* cited by examiner

Primary Examiner—Wellington Chin
Assistant Examiner—Kevin C. Harper
(74) Attorney, Agent, or Firm—John T. Whelan; Michael W. Sales

(57) ABSTRACT

A multicast network system utilizes a high speed link, such as a satellite link, to multicast multimedia information from the Internet to a plurality of receivers, such as personal computers. Information from selected web sites is organized into "channels" and provided to a multicast network for multicast transmission to the receivers. Updated channel information is also periodically provided. The receivers store the received channel such that a user can access the web page content in the channel at hard disk speed. Preferably, a conditional access system ensures that only authorized receivers receive the channels. The present invention also preferably includes a lower speed two-way connection to the Internet (such as dial up modem) which is used to report usage information and/or subscription information back to the web sites. The present invention also provides "seamless" or automatic access to this connection to allow the user to retrieve any information that has not been received and stored. The receiver also manages use of memory space and other applications that may be active on the receiver to ensure that the receipt and processing of the multicast information does not interfere with receiver operation.

86 Claims, 11 Drawing Sheets

SYSTEM AND METHOD FOR MULTICASTING MULTIMEDIA CONTENT

This application claims the benefit of U.S. Provisional Application No. 60/063,692 filed Oct. 27, 1997.

BACKGROUND OF THE INVENTION

1. Field of the Invention

The present invention relates generally to the distribution of multimedia content in a multicast network environment, and more particularly to a multicast network system having a high-speed multicast communication channel to multicast information to one or more receivers, and also having a return channel, which may operate at a lower speed, for permitting the receivers to interact with the network.

2. Description of Related Art

The most popular method for distributing multimedia information is the Internet's world wide web (WWW). Referring to FIG. 1, the WWW can be considered as a set of network accessible information resources, wherein many web servers 10 and web browsers 12 are connected to the Internet 14 via the TCP/IP protocols. (These protocols are described in the book "Internetworking with TCP/IP, Vol. I" by Douglas Comer, published by Prentice-Hall in 1991, which is incorporated by reference herein.) The web browsers 12 typically reside in personal computers (PCs) 16 which are connected to the Internet. The connection between the PCs 16 and the Internet 14 is often a low speed connection, such as a dial-up modem telephone line connection. The web servers 10 are also connected to the Internet, typically by high-speed dedicated circuits such as a 1.5 Mbps T1 connection. A PC user uses the browser 12 to access web sites 18 (which contain web pages, graphics and other multimedia content) from the servers 10 via the Internet 14 using Hypertext Transfer Protocol (HTTP). This "conventional" method for retrieving information from the world wide web requires a separate TCP connection each time a user accesses a web site, even if the user repeatedly access the same web site.

The world wide web is founded on three basic ideas:

(1) a global naming scheme for resources—Uniform Resource Locators (URLs);

(2) protocols for accessing named resources—the most common is the HTTP; and (3) hypertext—the ability to embed links to other resources which is typically done according to the Hypertext Markup Language (HTML).

Each web site 18 contains a collection of web pages operated by a single enterprise which appears to a user of a web browser 12 as a single set of related content. Web pages within a web site 18 are formatted according to the Hypertext Markup Language (HTML) standard. The HTML standard provides for the display of high-quality text, including control over the location, size and font for the text and the display of graphics within the web page. The HTML standard also provides for the "linking" from one web page to another, including linking between web pages stored on different web servers and even different web sites. Each HTML document, graphic image, video clip or other individual piece of content is identified by an Internet address, referred to as a Uniform Resource Locator (URL). As used herein, "URL" refers to an address of an individual piece of web content (HTML document, image, sound-clip, video-clip, etc.), and "URL data item" refers to the individual piece of content addressed by the URL.

While very popular, the above-described conventional dial-up method of accessing multimedia information is limited in at least two very important ways. First, most PC users access the Internet using dialup modems through an ordinary telephone line. These lines operate at a relatively low speed (e.g. 28.8 or 56 kbps) so that the display of an ordinary web page (e.g. 150 kbytes) takes a long time (e.g. 50 seconds) and the display of even short video clips (such as a 6 MB movie trailer in low-resolution "Quicktime" format) takes much longer (e.g. half an hour). Also, a user's telephone line is unavailable for normal voice calls the entire time that the Internet is being accessed.

Second, the conventional method uses point-to-point transfer, wherein each web site 18 must individually deliver its content to each web browser 12. Thus, a single 150 kbyte web page must be individually carried from the web server across the Internet to each browser that displays that page. If a popular web server delivers ten reasonably large pages (for a total of 1.5 MB) to each of 10,000 users during a busy hour, the web server would require at least a 33 Mbps bandwidth link to the Internet. The link to the Internet and a web server fast enough to fill the link is presently prohibitively expensive and complicated. Support for a million or more users during the busy hour would be completely impossible with current Internet technology.

The world wide web presently supports two methods (advertisements and subscriptions) for a web site operator to obtain revenue for its site's content. Advertisements are embedded into a web site's web pages, typically in the form of images, wherein a user can "link" to the advertiser's web site for more information by clicking on the image. Web-based advertising is superior to normal multicast advertising (e.g. TV, radio and newspaper advertising) in that the web server 10 is able to track exactly how many users have seen a given advertisement and, for repeat users, track by user which advertisements and how many such advertisements the user has seen.

If a web site generates revenue through subscriptions a user is only able to access that web site's content if they have "subscribed" to the site, i.e., agreed to pay to access the site. By requiring the user to provide an account name and password each time the user wishes to access the site, a web site controls access so that only paying subscribers can access the site.

Multicast systems are able to accommodate large numbers of users much more easily than the Internet when the users are accessing common content, because a given data item is multicast (i.e., sent only once) regardless of the number of receivers. Multicast networks distributing multimedia content have been in use in recent years over wide-area networks, such as a geosynchronous satellite multicast or FM-radio side-band transmission.

Some multimedia multicast systems have been proposed in academia which involve individually multicasting frequently accessed URLs which have been tagged to allow the receiver to filter and store only those web pages which, based on past history, may be of interest to the receiver. These systems have failed to be commercially deployed because they copy and multicast content without permission, thereby creating possibly conflict with copyright laws. Further, they do not guarantee the user a consistent set of content which can be accessed "offline" (i.e. not while connected to the Internet) and they do not provide a mechanism for preserving a web site's subscription and advertising revenue.

A commercially deployed multimedia multicast system is AirMedia, Inc.'s Internet Antenna system which uses an FM-radio side-band multicast to distribute news and information (with limited graphics). A computer terminal receives the multicast information and stores it on the computer's hard disk. The information is multicast in a proprietary format and is made available to the user via a special purpose application. The AirMedia system suffers from a lack of compelling content, partly due to its very low speed (e.g. 19 kbps) FM side-band multicast transmission system.

Another such system is Intel's Intercast system, which uses the vertical blanking interval within an NTSC multicast to multicast information in order to "data enhance" the TV channel it is carried on. The vertical blanking interval, which is normally used to carry closed caption information, is also a low-speed multicast (e.g. 30 kbps). Unlike the Air Media system, Intercast multicasts its data in a standard HTML format. Intercast provides a viewer application similar to a web browser which, together with special hardware, allows the user to watch the TV program on a computer monitor while simultaneously accessing the supplementary HTML multimedia data.

The primary problem with such multicast systems is the availability of good content for multicast broadcasting. The providers of good content will only specifically prepare their content for a multicast system after there are already a large number of users to receive such content or when the multicast system operator is willing to pay large amounts of money. However, a multicast system operator typically cannot get a large number of users until the system has good content and cannot obtain the financing to pay for good content until a large number of users have subscribed to the system. This "chicken and egg" problem of good content/number of users has long plagued the development of multimedia multicast systems.

In many cases, a new multicast system is launched by recycling preexisting content. Television, for example, overcame the "chicken and the egg" problem by recycling content originally developed for other media. Radio shows were converted to be both seen (on TV) and heard, often retaining the original actors, characters, plots and even much of the preexisting scripts. Movies, plays, operas and other existing material were also multicast on television. Once television was established using this preexisting content and achieved a critical mass of users, television multicasters could afford to develop new content targeted exclusively for television (i.e., sitcoms, mini-series, nightly news, late night talk-shows, infomercials, etc.).

Another major obstacle to the successful deployment of multicast systems has been the impact of processing (receiving, filtering, storing, etc) the multicast data on the receiving computer. Prior multicast systems have failed because receiving the multicast data negatively impacted the receiving computers' performances, such that users frequently disabled the multicast application in order to run other applications. Often, users would forget to restore the multicast receiver application, thereby triggering a complete loss of functionality. Computer games are a classic example of an application that uses all the resources of a computer and, as such, are negatively impacted by the receipt and processing of multicast data. Further, personal computer operating systems generally do not provide optimal sharing of resources between competing real-time applications. Thus, the typical personal computer user will not tolerate loss of performance (such as "jerky" video and graphics and/or unresponsive game control) for the sake of receiving multicast multimedia content.

In some multicast systems, such as Air Media, the impact on the receiving computer was insignificant due to the low speed of the multicast link. However, a high-speed multicast link is very desirable as it increases the quantity and quality of the content available to the user. Thus, there remains a need for a high-speed multicast system which is compatible with existing content and does not interfere with other processing performed by the receiving computer.

SUMMARY OF THE INVENTION

Prior to the present invention, no multimedia multicast system was able to solve the number of users/good content "chicken and the egg" problem facing new multicast systems. The present invention overcomes this problem by providing access to unmodified, high-quality content from existing web sites in a way which requires no changes to the operation of the web sites and also preserves web sites' advertising and subscription revenues. The present invention also utilizes a high-speed link (such as a satellite link) to provide a large quantity of content and includes several innovative mechanisms for receiving such content from such high-speed link with minimal impact on the operation of other applications within the receiving computer. The present invention is referred to herein as "DirecPC® WebCast" or "WebCast." DirecPC® is a registered trademark of Hughes Network Systems. The basic DirecPC® system, which generally provides a one-way high speed link for receiving information from the Internet but does not utilize a multicast network, is described in co-pending application Ser. No. 08/257,670 (filed Jun. 8, 1994) and Ser. No. 08/795,505 (filed Feb. 7, 1997), which are assigned to the same assignee as the present invention.)

Generally, WebCast comprises a multicast network which multicasts selected web site content (called "channels") onto a receiving computer's hard disk, making that content available to the user at "hard disk" speed. As set forth in detail below, a channel is a set of web content which a user may be interested in repeatedly accessing. Preferably, the web content within the channel is periodically updated. WebCast reports sufficient usage information to the web site (i.e. what content has been accessed by the user) to support advertising-based revenues, while requiring no change to the web site's operation.

The present invention also supports subscription-based revenue web sites. Each receiving computer receives an Electronic Program Guide (EPG), which supports the promotion and subscription to available web site channels. The EPG provides functionality beyond what is accomplished by static web pages in that it permits easy access to channels to which a user has subscribed and provides promotional material for all other available WebCast channels. Such promotional material is accessed from the EPG's cached content until the user subscribes or unsubscribes to the channel. At this point, the WebCast software contacts a conditional access system in the multicast network and performs a transaction to initiate or terminate the subscription. The conditional access system optionally provides subscription information to the multicast system's billing system for subsequent billing of the WebCast user and/or reporting back to the channel's web site.

Within the receiving computer, WebCast configures a web browser to display the stored (or "cached") web site channel content. When started, a content viewer on the receiving computer configures the web browser to access the cached content via an HTTP proxy-server within the WebCast content viewer. A "cache-miss" occurs when the browser requests a URL which is not stored in the cache of multicast data. When a cache-miss occurs, the WebCast software notifies the user and offers the user a choice of accessing the content via normal (i.e. dial-up) Internet access. If the user so chooses, the WebCast application establishes a connection to the Internet (if needed) and forwards the requests for content to the web server on the Internet which contains the missing content. Preferably, this Internet connection is "seamless," in that it requires no action by the user but is automatically established by the WebCast software. WebCast also from time-to-time establishes a connection to the Internet to send usage information to the appropriate web sites.

According to one aspect of the present invention, a system and method that transmits content organized into channels, wherein a channel's content includes a plurality of URL data items and each URL data item is addressed by a URL, comprises assigning one or more multicast addresses to each channel, scheduling the assembling of a channel's content, assembling the channel's content, fragmenting the channel's content into packets, wherein each packet is addressed with one of the channel's multicast addresses, and multicasting the packets.

According to another aspect of the present invention, a system and method that transmits content organized into channels, wherein a channel's content includes a plurality of URL data items and each URL data item is addressed by a URL, comprises scheduling the assembling of a channel's content, assembling the channel's content, compressing a subset of the URL data items, wherein each URL data item is compressed individually independent of other URL data items such that each compressed URL data item can be decompressed without decompressing other URL data items, fragmenting the channel's content into packets, and multicasting the packets. The present invention may further assemble a base package of the channel's content, wherein the base package contains each URL data item in the channel, and assemble a delta package of the channel's content, wherein the delta package contains URL data items which have changed or are new since the previous assembling of the base package.

According to yet another aspect of the present invention, a system and method that transmits content organized into channels, wherein a channel's content includes a plurality of URL data items and each URL data item is addressed by a URL, comprises scheduling the assembling of a channel's content, assembling the channel's content according to the schedule, fragmenting the channel's content into packets, multicasting the packets to a plurality of receivers, wherein each receiver stores the received channel's content in a receiver memory, and receiving usage reports from each receiver, wherein each usage report identifies a subset of URL data items from the stored URL data items that were accessed from the receiver memory.

According to yet another aspect of the present invention, a receiver for receiving from a multicast network content organized into channels, wherein a channel's content includes a plurality of URL data items and each URL data item is addressed by a URL, and wherein the multicast network transmits the channel's content to the receiver in packets, determines a multicast address used to carry a channel's packets, enables reception of packets containing a channel's multicast address, receives the packets containing a channel's multicast address, assembles the received packets into a channel's content, stores the channel's content, and allows a user to access the stored channel's content. The receiver may further individually decompress each compressed URL data item in the stored channel content at a time when the user accesses the URL data item.

According to yet another aspect of the present invention, a receiver in a multicast system receives URL data items from a multicast network, stores the received URL data items, allows a user to access the stored URL data items, and tracks user access to the stored URL data items. The receiver may further determine when a URL data item requested to be accessed by the user is not present within the stored URL data items, notify the user that the requested URL data item is not stored, and allow the user to access the non-stored URL data item via a connection (such as dial-up modem) to a TCP/IP network, such as the Internet.

According to yet another aspect of the present invention, a receiver in a multicast system monitors receiver activity, and selectively receives content from a multicast network, wherein the content is selectively received based on the monitored receiver activity. The receiver may be, for example, a personal computer and the monitored activity may include other applications/programs running on the receiver, disk/memory utilization and/or user input (keystrokes or mouse clicks). The receiver may further suspend reception of content pending conclusion of the monitored activity, such that reception does not interfere with the monitored activity.

According to yet another aspect of the present invention, a receiver in a multicast system comprises a package receiver for receiving packets containing URL data items from a multicast network and assembling the received packets into a channel, wherein the channel comprises a set of URL data items, a memory for storing the channel, and a content viewer for allowing a user to request access to and access the LRL data items in the stored channel.

According to yet another aspect of the present invention, a system for multicasting URL data items from web sites to a plurality of receivers comprises a web crawler for retrieving URL data item from the the web sites and formatting the retrieved URL data item into packages, a package delivery subsystem for receiving the packages from the web crawler, fragmenting the packages into packets and transmitting the packets to a multicast network, and a conditional access system for determining which receivers are authorized to receive the packets, wherein the multicast network multicasts the packets only to authorized receivers.

According to still another aspect of the present invention, a system for multicasting content organized into channels to a plurality of receivers, wherein a channel's content includes a plurality of URL data items from at least one web site, comprises a web crawler for retrieving the URL data items from the web site via a TCP/IP network and formatting the retrieved URL data items into packages, a package delivery subsystem for receiving the packages from the web crawler and fragmenting the packages into packets, a conditional access system for determining which receivers are authorized to receive the packets, and a multicast network for receiving the packets from the package delivery subsystem. The conditional access system encrypts the packets and the multicast network multicasts the encrypted packets to the authorized receivers, wherein the authorized receivers store the packets in a memory and decrypt the packets.

DETAILED DESCRIPTION

WebCast Channels

The present invention organizes the URL data items it transmits into "channels," wherein a channel is a set of URL data items which a user may be interested in repeatedly accessing. A channel ordinarily is a subset of a web site's content (i.e. a set of web pages) to be periodically extracted from the web site by a web crawler and delivered to subscribing users by conditional access protected multicast file transfer. Thus, a channel's content consists of a collection of URL data items, typically all from a single web site. Preferably, a channel's content is periodically updated. A typical channel might, for example, contain the content of 3,000 different URL data items. Examples might include any web site, such as www.direcpc.com or www.hns.com, a general news web site, such as www.abcnews.com, or a financial news site, such as quicken.excite.com.

A user subscribes to WebCast channels of interest and only subscribed channels are received and stored on the user's receiving terminal. A channel's content and multicast schedule is specified by a WebCast channel definition. Each channel's channel definition is predetermined. However, WebCast may allow a channel definition to be altered. Each channel definition includes at least:

(1) A list of web strands, wherein each strand includes a starting address (URL) and a search depth. Since each web page may contain links to other pages, search depth refers to the number of links that are to be retrieved and stored with the original page. In a preferred embodiment, the search depth is set to two "levels" from an original web page. Thus, the channel will include the original web page and all other pages which are two hypertext links (i.e. two mouse clicks) away from the original page. The search depth, however, may be set to any number of levels as best suits the web site to be included in the channel.

(2) A list of filter settings indicating which URLs should be included in or excluded from the channel. Another set of filters may also identify how, if at all, URL data item is to be compressed prior to being transmitted. Yet another set of filters may define the "hit-tracking" attributes to be assigned to each URL, as discussed in detail below. The web crawler starts at each of the starting URLs and searches all links that pass the filters to the specified search depth.

(3) A schedule specifying how often and in what way a channel's content is packaged and multicast by a multicast network to each user.

System Components

Figure 2:
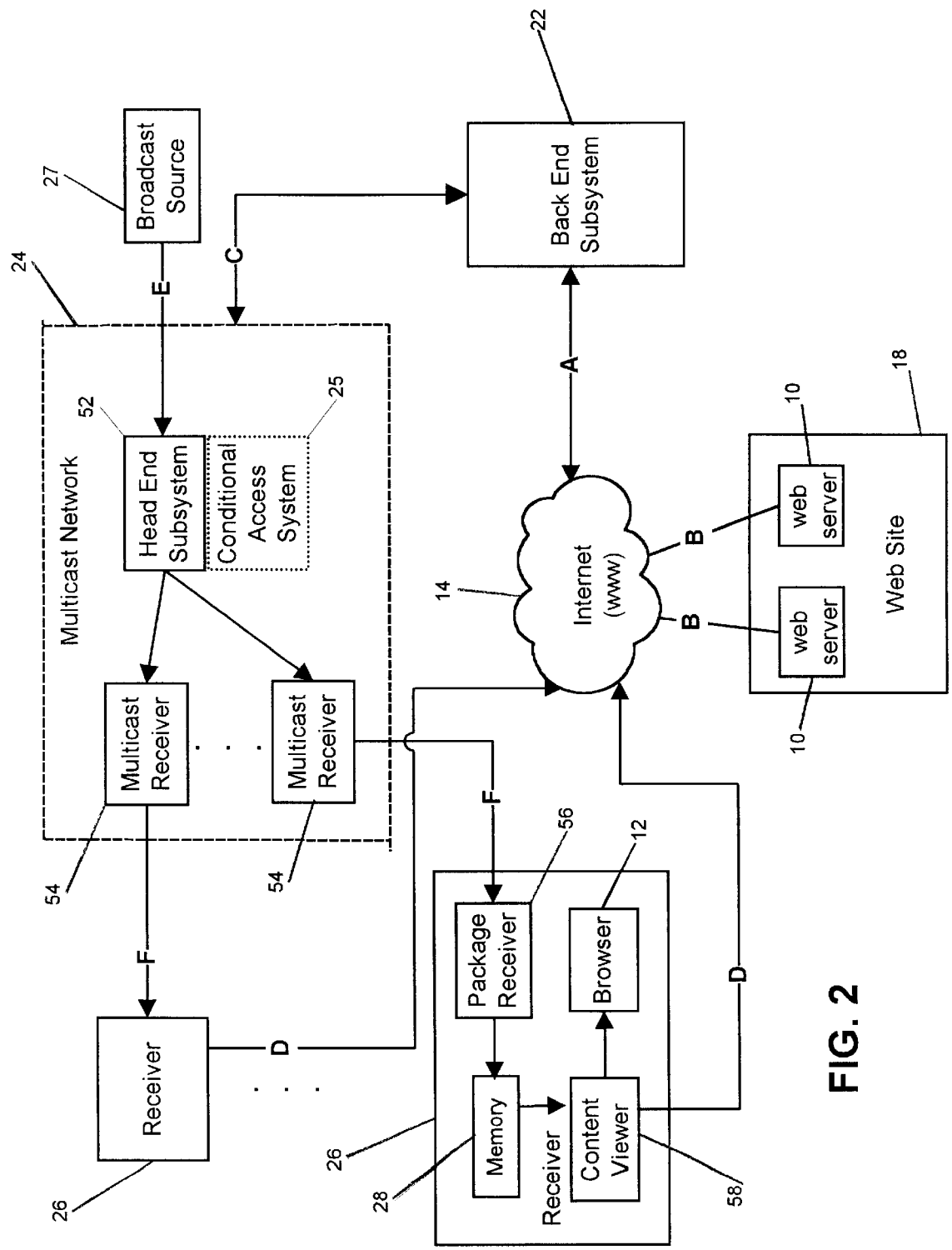
FIG. 2 is a block diagram of the multicast system of the present invention.

Referring to FIG. 2, the WebCast system of the present invention consists of a back-end subsystem 22 which communicates with one or more multicast networks 24 (link C). The back-end subsystem 22 is connected to a plurality of web sites 18 (from which content is gathered) via a TCP/IP internetwork, such as the Internet 14 (links A, B). The multicast network 24 multicasts information retrieved from the web sites 18 to a plurality of receivers 26 over a high-speed link (F), such as a satellite or other high-speed (over 200 kbps) link. Each receiver 26 may be, for example, a personal computer in a user's home or business. However, the receivers 26 may also comprise set top boxes, digital televisions or other devices capable of receiving Internet content. Each receiver 26 is also preferably connected to the Internet 14 by a low-speed link (D), which may be, for example, dial-up modem, ISDN, two-way cable, or the like. Further, the present invention could be implemented with other TCP/IP networks other than the Internet, such as intranets.

The basic functions of the WebCast system components are set forth below and the various data flow paths are depicted in FIG. 2. It is understood, however, that the described functions may shift location among the system's components depending on a particular system configuration.

Back-End Subsystem Functions

The back-end subsystem 22 (which generally comprises a computer or set of networked computers) performs at least the following functions:

(1) Gathering URL data item from the web sites 18 via the Internet 14 or a private TCP/IP network or intranet (links A and B) and assembling it into packages.

(2) Fragmenting the large (i.e. multi-megabyte) packages (which contain URL data items from the web sites 18) into an appropriate sequence of packets and passing the packets to the multicast network 24 (link C);

(3) Optionally processing usage reports from the receivers 26 (links D and A) and providing the usage reports back to the web sites 18 (links A and B);

(4) Optionally processing channel subscription and unsubscription requests from the receivers 26 (links D and A) and optionally forwarding such requests to the web sites 18 (links A and B); and (5) Optionally performing conditional access for the WebCast channels. Conditional access is normally performed by a conditional access system 25 in the multicast network 24, but can be implemented by the back-end subsystem 22 if the multicast network does not include a conditional access system or if use of the multicast network's conditional access system is not desirable.

Multicast Network Functions

The multicast network 24 performs at least the following functions:

(1) Receiving packets from the back-end subsystem 22 (link C) and optionally multiplexing the packets with data (such as digital video, audio voice, etc.) from any other broadcast source(s) 27 (link E);

(2) Multicasting the packets to the receivers 26 over the high-speed link (link F);

(3) Optionally performing conditional access via the conditional access system 25 to ensure that only subscribing receivers may receive a channel's packages;

(4) Optionally providing a return path from the receivers 26 to the back-end subsystem 22 to allow usage reporting;

(5) Optionally processing channel subscription and unsubscription requests from the receivers 26; and (6) Optionally providing Internet access to allow a receiver to access "cache-misses" from the Internet.

Receiver Functions

Each receiver 26 performs at least the following functions:

(1) Interacting with the multicast network 24 to enable reception of the appropriate addresses;

(2) Processing received packets from the multicast network 24 (link F);

(3) Reassembling WebCast channel packages from the received packets and storing each as a file in a memory (e.g. hard disk) 28;

(4) Managing space in the memory 28 and managing use of the receiver's resources to minimize impact on other applications running on the receiver when multicast packages are received and processed;

(5) Providing the user with promotional material (i.e. through the EPG) that helps the user determine which WebCast channels to subscribe to;

(6) Providing the multicast network 24 (or optionally the back-end subsystem 22) with subscription or unsubscription requests;

(7) Reporting usage information to the back-end subsystem 22 via the multicast network;

(8) Optionally decrypting the received packages when the multicast network is not providing conditional access but conditional access is desired; and (9) Interacting with the back-end subsystem 22 to obtain conditional access key material if the back-end subsystem (rather than the multicast network) is performing conditional access.

Back-End Subsystem Components

Figure 3:
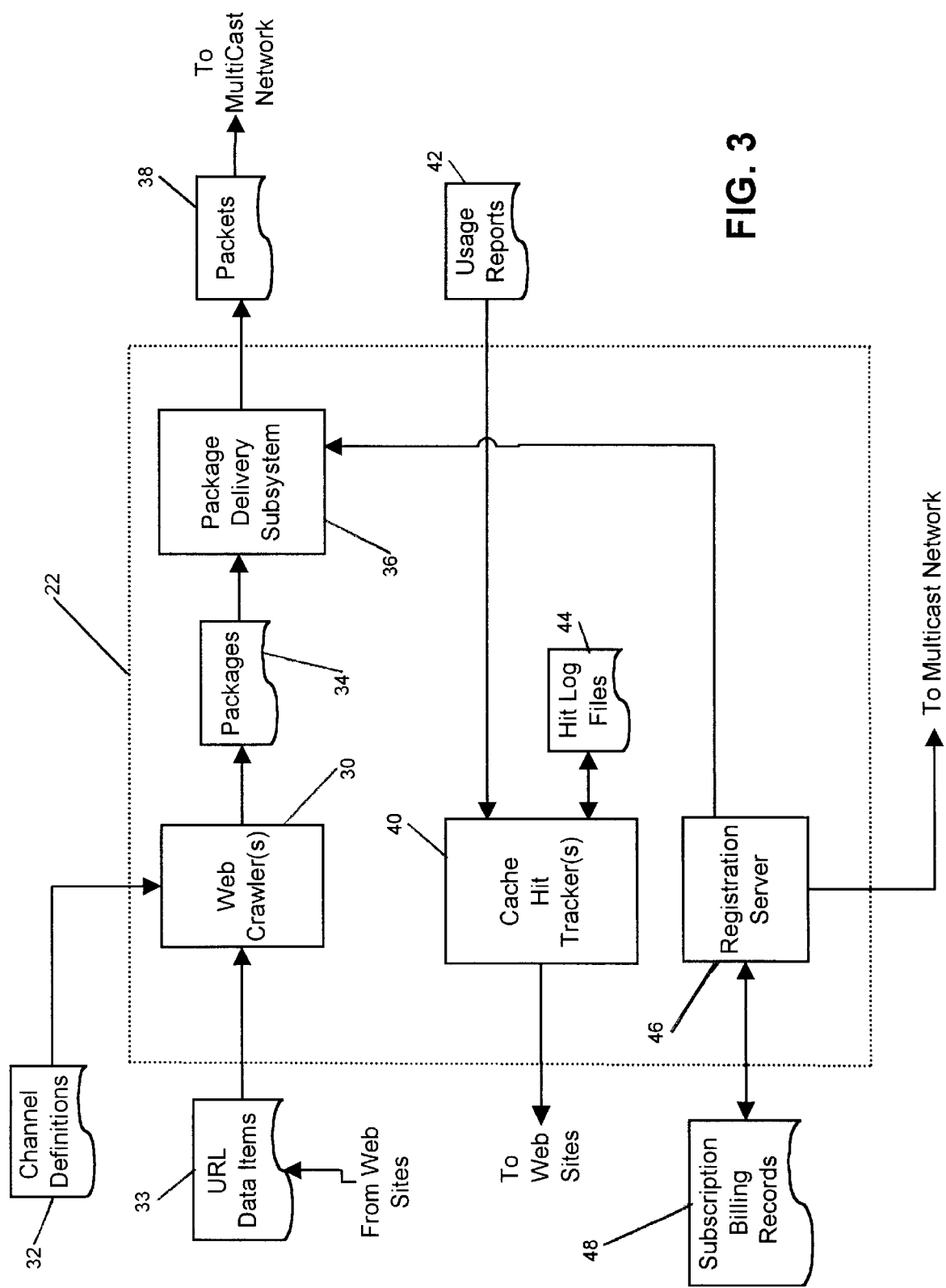
FIG. 3 is a block diagram of the back-end subsystem of the multicast system of FIG. 2.

Referring to FIG. 3, the back-end subsystem 22 includes two major components: (1) one or more web crawlers 30; and (2) a package delivery subsystem 36. Each web crawler 30, generally, is a computer which accesses channels from the web sites 18 according to predetermined channel definitions 32. The web crawler 30 is similar to commercially available web crawlers, such as TelePort Pro and Web-Wacker. The primary difference from commercial web crawlers is that commercial web crawlers store each URL data item as a file on disk and the DirecPC WebCast web crawler 30 formats the URL data items into packages (see below). As explained in detail below, the web crawler 30 gathers URL data item from the web sites 18. The URL data item is gathered from the list of URLs in the channel definition and other URLs which are "linked" to the listed URLs according to the search depth. The web crawler 30 then formats the gathered URL data item into packages 34 (also explained in detail below) and submits the packages 34 to the package delivery subsystem 36.

The package delivery subsystem 36 receives the packages 34 from the web crawler(s) 30 and fragments the packages 34 into an appropriate sequence of multicast packets 38, which are provided to the multicast network 24 for multicast transmission to the receivers 26.

The back-end subsystem 22 also optionally includes one or more cache hit trackers 40 which receive usage reports 42 from the receivers 26. The usage reports may be stored as hit log files 44 which are periodically delivered to the web sites 18. (The usage reporting function of the present invention is described in detail below.)

The back-end subsystem 22 also optionally includes a registration server 46 (which may also be referred to as an auto-commissioning server). The registration server 46 provides a convenient method for users to subscribe to WebCast channels and also produce package delivery envelopes and subscription billing records 48 which track subscriptions and canceled subscriptions. (The subscription function of the present invention is also described in detail below.)

Web Crawling

As set forth above, the back end subsystem 22 contains one or more web crawlers 30 which package a channel's content and submit it to the package delivery subsystem 36 for multicast transmission to the receivers 26 via the multicast network 24. The process whereby the web crawler(s) 30 gather content from various web sites 18 is generally referred to as "crawling." Preferably, the web crawlers 30 crawl the web sites periodically and/or on a scheduled basis. The web crawler 30 formats a channel's content into a single data structure that is preferably stored and transferred as a computer "stream" or "flat" file (which are used by most personal computer file systems. A file containing channel content is referred to as a package 34.)

The web crawler 30 may be located in the back-end subsystem 22 near the package delivery system 36 which, in some cases, minimizes the effort to manage web crawling. Alternatively, the web crawler 30 may be located near the web site(s) it is crawling, for example, on the same local area network as the web site's servers. This configuration reduces the amount of traffic across the wide area network in that only compressed packages (rather than all of the channel's content) are sent across the wide area network.

The web crawler 30 typically does not receive an exhaustive list of the URLs to be included in the package. Instead, the web crawler receives a channel definition 32 (which may either reside in the web crawler or be retrieved by the crawler from an external server) containing a list of the URL addresses of the URL data items to be included in the channel. For each starting URL address in the channel definition 32, the web crawler 30 creates a list of URL addresses to be crawled, which initially contains only the starting address. The web crawler 30 repeatedly retrieves each URL data item and removes that URL address from its list until the list is empty. The web crawler may perform many such retrievals in parallel to reduce the time needed to crawl a channel.

The web crawler 30 analyzes the content of these linked data items of each retrieved URL data item to determine if it contains "links" to other URL data items. Typically, only HTML pages contain links. If so, the URL addresses are added to the list of URL addresses to be crawled if the additional URL data item passes the channel definition filters. The URLs added to the list may include frames, embedded graphics, java applet classes and references (also called "links") to other URLs external to the page. Frames can be thought of as embedded HTML pages. Frames, embedded graphics, java applet classes and embedded graphics within the frames can be thought of as part of a web page and are at the same "level" or "depth" as the HTML which referenced them. URLs which are "linked" from the page under analysis are considered one level "deeper" (i.e., further away from the starting address) than the page that referenced them. A URL's crawl depth is stored, along with the URL address itself, on the list of URLs to be "crawled." A URL is only placed on the list of URLs to be crawled if it passes the channel definition's filters and if its depth does not exceed the search depth associated with its starting address and the URL has not previously been entered into the list.

A web server will often respond to a request for a URL by "redirecting" the request to another URL (often on a different web server). Such a redirection does not increase the depth of the URL that is eventually retrieved.

The web crawler(s) 30 can be programmed to gather the entire set of a channel's content and place it into a package 34, which is referred to herein as a "base" package. Web crawling to create a base package is referred to herein as a "base crawl." A channel's content, however, may be frequently updated by the web site operator and the updates may occur on an unknown basis and it is important to provide a WebCast user with an updated and consistent representation of a web site's content. Thus, once a base package has been produced, the web crawler 30 can be scheduled to produce a package which contains only the URL data items which have changed since the base crawl occurred. A package containing only the changed or updated content is referred to herein as a "delta" package. Web crawling to create a delta package is referred to herein as a "delta crawl."

Upon retrieving a URL data item, the web crawler determines whether and how to include the URL data item within the package being produced by the web crawler. This determination depends on: (1) various filter settings; (2) whether a base or delta package is being crawled; and (3) if a delta package is being crawled, whether the URL data item is present in the channel's base package and, if so, whether the URL data item has changed.

If a base package is being crawled, a URL is included in the package if it passes the filters. If a delta package is being crawled, the URL is included in the package if it passes the filters and it either does not exist in the base package or has changed since the version in the base package. Whether the URL has changed can be determined either by actually comparing the content or by checking the "last-modified" field provided by the web server. For some sites, the actual comparison of data is needed as the "last-modified" field cannot be relied upon. Alternatively, the web crawler 30 can determine whether the URL data item has changed by comparing checksum(s) or message digest(s) associated with the data item.

Crawling is typically the preferred mechanism for obtaining a channel's URLs in that it requires no changes to the web site's production and operation. This is very important when overcoming the number of users/good content "chicken and egg problem" described earlier. Crawling may, however, waste networking and web server resources in that each URL must be individually checked on each crawl. For a 40 MB base package (uncompressed), which is being crawled every half hour, this data flow exceeds 80 kbps.

Thus, for web sites that correctly set the "last-modified" date of URLs, the present invention reduces processing time by requesting the URLs with an HTTP "Get If Modified Since" request. Web sites which are available for subscription in WebCast produce their own channel definitions which accurately indicate both what URLs are to be included in the channel and when the URLs have changed. Such a channel definition may simply list every URL to be included in the channel and when each was last modified. With such a channel definition, the web crawler, by storing retrieved URLs and their modification date, need only gather URLs which are new or which have changed since the previous crawl. This provides a web site with maximum control over the content in its channel, while minimizing the web server and networking resources required to gather the content.

Dynamic web site content poses a special problem to WebCast crawling in that the simple analysis of HTML is insufficient to gather all the required URLs for a channel. An example of dynamic content is a Sports Score Java Applet which, when started, retrieves and displays a set of sports scores. The URL containing the scores is not referenced by the HTML and would not normally be gathered by the web crawler. The data can only be gathered by actively running the Java Applet.

Figure 4:
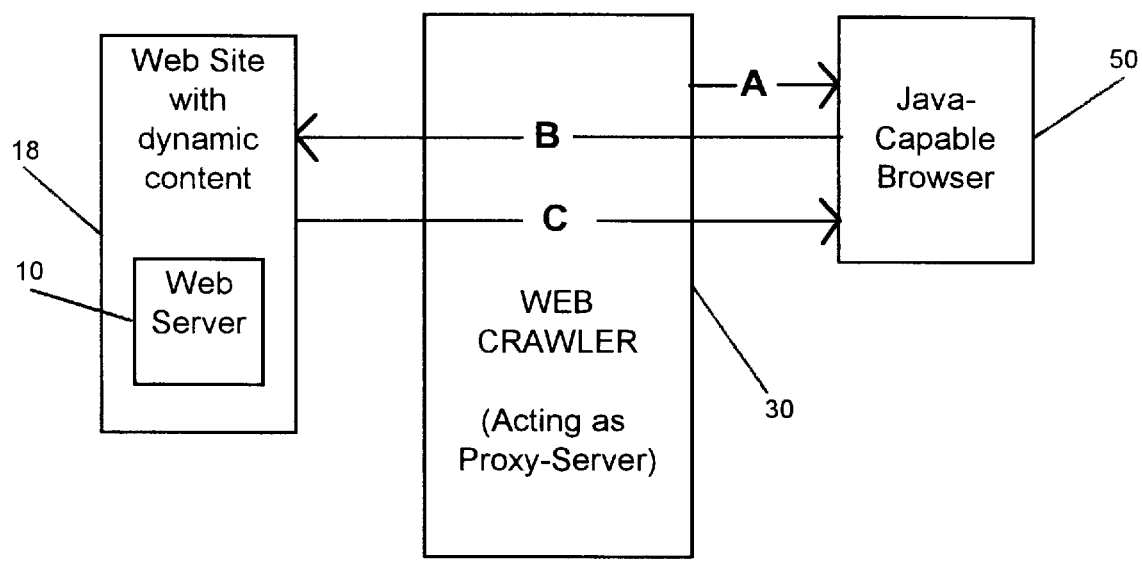
FIG. 4 is a block diagram of the process used by the web crawler of FIG. 3 to gather active web site content.

To overcome this deficiency, the channel definition allows a list of pages whose content is gathered by a Java-capable browser. Referring to FIG. 4, the web crawler 30 configures a Java-capable browser 50 to use the web crawler as a proxy-server and directs the browser 50 to display the configured pages with dynamic content (data flow A). The browser 50 gathers the active content from a web server 10 via the web crawler 30, which is now acting as a proxy-server (data flow B). Configuring the browser 50 to use the web crawler as a proxy-server allows the web crawler to monitor and record the URLs accessed by the browser, including the active content (data flow C).

Compression

As set forth above, the web crawler 30 gathers URL data items for a channel and places them into packages 34. Each package contains: (1) a set of URL data item; (2) indexing information, such as a hash table, to allow quick access to the URL data item; and (3) various supplemental information identifying the set of URL data item contained by the package and other information to guide the use of its content. The web crawler 30 uses a lossless compression algorithm, such as the one created by Liv and Zempel in 1977 (LZ77) or other algorithm, to individually compress each URL data item. (An alternative lossless compression algorithm is described in co-pending application Ser. No. 08/982,864 entitled "Data Compression For Use With A Communications Channel, filed on Dec. 2, 1997 and assigned to the same assignee as the present invention.) URL data item which can be compressed is individually compressed (and flagged as compressed) prior to being placed into a package 34 (rather than compressing the package as a whole).

In many cases, URL data item which has changed between the time of a base crawl and a delta crawl has only partially changed. For example, many web sites change the advertisements embedded into a HTML page each time the page is served. In such a case, only the few characters containing the URL data item of the advertisement change from one crawl to the next crawl. In other cases, the bulk of a web page consists of "boiler plate" which provides a consistent look and style to the web page. Even when the real content within such a web page has completely changed, only a small fraction the page's characters change. In view of this, the size of delta packages can be minimized if the web crawler 30 performs what is referred to herein as "difference compression."

With difference compression, the web crawler 30 compares a URL data item to be included in a delta package with the corresponding URL data item in the base package (if it exists). The web crawler 30 divides the delta package URL data item into sections of data and, for each section, places into the compressed version of the URL data item either:

(1) a reference to the base package's URL data item where that section of data can be found because it appears identically in both the base package's and the delta package's URL data item. This reference is generally much smaller than the data itself, which inherently provides compression. An example of a reference is an offset from the beginning of the URL to the first byte and an offset to the last byte being referenced. Other more complex, but more compact mechanisms may alternatively be used to encode a reference; or (2) the section of data from the delta package's URL data item. This does not provide any compression but exists to ensure that the delta package's URL data item can be reassembled without modification from the base package's URL data item and the difference compressed URL data item. The difference compressed URL data item can then be optionally compressed with a lossless data compression algorithm, such as LZ77, prior to being placed into the delta package.

The channel definition filters indicate whether a URL data item included in the package should be compressed and, if so, the compression algorithm to be used. For delta packages, the channel definition filters also specify whether difference compression is to be applied (and which algorithm to use to determine the difference) to a URL to be included in the delta package.

Table 1 provides examples from WebCast channels illustrating the effectiveness of base/delta packages, individual compression of URL data items and difference compression.

TABLE 1

| WebCast Channel | ABC News | ESPN Sportszone |
|---|---|---|
| Size of base package without compression | 38.1 MB | 22 MB |
| Size of base package with standard LZ77 compression | 19.8 MB | 10.2 MB |
| Compression ratio with standard LZ77 compression | 1.92 to 1 | 2.16 to 1 |
| Size of delta package with LZ77 compression only (i.e. no difference compression) | 11.8 MB | 6.3 MB |
| Size of delta package with LZ77 compression and difference compression | 2.8 MB | 1.6 MB |
| Compression ratio with delta package, LZ77 compression and difference compression | 13.61 to 1 | 13.75 to 1 |

The resulting compression ratio (i.e. approximately 14 to 1) is much higher than compression ratios achievable from the direct application of ordinary lossless data compression algorithms, which typically do not exceed 2.5 to 1 on such packages. The use of delta packages in combination with base packages thus greatly reduces the amount of bandwidth needed to keep a receiver "up-to-date" with a web site compared to repeatedly multicasting the full set of a web site's content. The present invention also achieves this while preserving the objective of always presenting a consistent snapshot of a web site's content.

The present invention may also use delta packages of delta packages. For example, a sports web site may frequently update scores for a game with no other changes to the web site. In such a case, only the URL data item containing the scores changes from one crawl to the next. Thus, a delta package may be generated and difference compressed such that it contains only the difference (i.e. the new score) from the previous delta package. The use of delta packages of delta packages further reduces the amount of data which must be transmitted.

Advantages of Packaging and Compression

The present invention's organization of web site content into channels and packages provides significant advantages and benefits for reducing the impact of multicast receiving on the function of other applications active on a receiver 26. For example, organizing each package 34 as a single file with built-in indexing for quick access minimizes the processing that the receiver 16 must perform on the content prior to displaying it to the user. The alternative, which is to store each URL data item as a separate file (as is commonly done with existing browser caches), requires significant processing (and additional memory/disk space) to divide the URL data items into individual files and to delete obsolete files. Because many web channels may contain over 3000 URLs, this processing (i.e. of 3000 separate files) may take several minutes or longer. Further, this processing must take place either after the content has been received (disrupting whatever other processing is taking place at the time) or when the user first accesses the content (causing the user to have to wait while this process is taking place). In addition, retaining all the URL data item in a single file reduces the processing required to display content by eliminating the overhead of opening and closing a file for each URL.

Compressing each URL data item individually (rather than compressing the package as a whole) also minimizes the processing that the receiver 16 must perform prior to displaying a package's content. Decompressing the package as a whole requires significant processing which, as set forth above, must take place either upon reception (disrupting whatever is happening at the time) or when the user first accesses the package's content (forcing the user to wait). Whole package compression also uses more memory or disk space because the content of the whole package must be stored in decompressed form. Decompressing each URL data item individually as it is needed allows the data items to be stored in compressed form (reducing memory space). Also, only data items that are actually accessed by the user is decompressed, thus reducing overall processing time. Also, because the decompression of URL data items is performed at a time when the user has directed the receiver to display content, the decompression is not likely to disrupt other applications that require use of receiver resources.

Still further, the use of delta and base packages allows receipt of base packages to be scheduled for periods of time when the receiver 16 can be expected to be idle (e.g. late at night) while the smaller delta packages can be received throughout the day. Thus, a receiver can be powered off, or can suspend, abort or terminate package reception during times when the receiver is dedicated to other processing, yet still be quickly brought "up-to-date" after package reception has been enabled. The present invention also ensures that the user is presented with a complete, consistent version of the content. Thus, the present invention provides significant advantages over other multicast systems which often required the receiver to be powered up continuously such that users did not use the system or accidently terminated reception by turning of the receiver. With delta and base package transmission, particularly where base packages are transmitted overnight or during some other inactive period, a user can turn off the receiver or suspend package reception during peak usage time and still have the receiver be quickly brought up to date when package reception is restarted.

The use of delta packages, particularly with difference compression, results in much smaller transmissions because less data must be received and processed to keep a receiver up-to-date. This results in lower bandwidth requirements and lowers the impact on the receiver when a delta package is received.

The organization of content into channels which are subscribed to by the user and into single-file packages further allows the content to be transmitted via very efficient multicast file transfer protocols wherein virtually no receiver processing is wasted on filtering out content which is not of interest to the user. It also allows the scheduling of transmissions such that a user can determine when reception must be enabled to receive the content they desire.

While the preferred embodiment of the present invention stores each base or delta package as a single file, storing each package in a small number of files (i.e. wherein the number of files is less than the number of URLs in the package) still achieves many of the benefits described above and may be desirable within some multicast networks. In addition, creating the indexing information within the receiver from a single file (or small number of files) also achieves many of the benefits described above.

Multicast Network Components

Referring again to FIG. 2, the multicast network 24 generally includes the following components, although some components may vary depending on the specific embodiment of the multicast network:

(1) A head-end subsystem 52, which is responsible for: (a) taking packets from the back-end subsystem 12 (link C) and multicasting the packets to the receivers 26 (link F); and (b) optionally multiplexing the back-end subsystem's packets with data (i.e. digital video, audio, etc.) from another broadcast source 27 (link E) and multicasting the resulting data stream(s) to the receivers 26.

(2) A multicast receiver 54, which is responsible for providing multicast packets from the requested channels to the receivers 26 (link F). Alternatively, the multicast receiver may be integrated with the receiver 26, such as in a personal computer with a receiver peripheral and associated software. A digital satellite TV settop box or a cable TV settop box are other examples of receivers that may include integrated multicast receivers.

(3) A conditional access system 25, which may be integrated with the head end subsystem 52. The conditional access system 25 may be of the type described in U.S. Pat Nos. 5,481,609; 5,282,249; 5,659,615; or 5,652,795, which are incorporated herein by reference. General crypto technology is also described in "Applied Cryptography, 2nd Edition", published by John Wiley and Sons, 1996, which is also incorporated by reference.

The conditional access system 25 uses a cryptographic key or set of keys to encrypt packets in such a way that a receiver 26 only decrypts packets which it is authorized to receive. In general, the receiver 26 notifies the multicast receiver 54 of the channels to be received. If the multicast receiver 54 is integrated with the receiver 26, this is done through a software interface. The multicast receiver 54 then contacts the conditional access system 25 to start encrypting the packets and the receiver is provided with the appropriate key to decrypt the packets which it is authorized to receiver.

In the context of this invention, the multicast network is not limited to any particular type of network and may comprise any digital multicast network wherein the data being carried is segmented and placed into one or more relatively small packets (e.g. approx. <1 MB) and where each packet includes a multicast address field. In a preferred embodiment, the multicast network 24 is a geosynchronous satellite direct to home system carrying both digital video and data services. In another embodiment, the multicast network 24 is a two-way cable television network carrying both analog (and/or digital) television as well as digital multicast data services. The multicast network may also comprise any other type of multicast network, such as ethernet (wherein the destination MAC address field carries the multicast address), Digital Video Broadcast (DVB) satellite, terrestrial and other media, ATSC digital television and other multicast networks that use MPEG2 transport packets and wherein the PID field carries the multicast address, MBONE (experimental Internet multicast network), DVB carrying multiprotocol encapsulated data, and any other IP (Internet Protocol) multicast network wherein IP packets are used and the destination IP address field holds a multicast address.

Receiver Components

In a preferred embodiment, the receiver 26 is a personal computer. However, the receiver 26 may comprise any component capable of receiving and processing packets from a multicast network, such as a settop box which provides data services (optionally along with digital video services) which are viewed through a television, or a digital television which integrates the functions of a settop box and a television to provide both video and data services. Portable or handheld computers and the like with wireless receivers are another example of a receiver that may be used with the present invention.

Referring to FIG. 2, each receiver 26 includes software which may be functionally decomposed into the following components. It is understood, however, that the actual organization of the software may vary within a specific implementation.

(1) A Package Receiver 56—The package receiver 56 processes received packets from subscribed-to channels via the multicast receiver 54 and reassembles the packages from those packets. (As set forth above, the multicast receiver may also be located in the receiver.) As discussed above, each package is stored as an individual file (or a small number of files) in the receiver memory 28 (i.e. on a receiving computer's hard disk). Optionally, if the multicast network 34 is not providing conditional access, the package receiver 56 may decrypt the packages, if conditional access is desired. The package receiver also manages the use of space in the receiver memory 28 and manages the use of receiver resources to minimize the impact of multicast receiving and processing on other applications running on the receiver.

(2) A Content Viewer 58—the content viewer 58 in the receiver 26 provides the user with the promotional material (i.e. through the Electronic Program Guide (EPG)) that helps the user determine which channels to subscribe to. In a preferred embodiment, the content viewer also interacts with the multicast network 24 (or optionally the back-end subsystem 22) to subscribe or unsubscribe to channels at the user's direction. If the back-end subsystem 22 is performing conditional access (rather than the multicast network), the content viewer 58 preferably also interacts with the back-end subsystem to obtain key material. The content viewer 58 may also preferably report usage information (i.e. information about which channels were accessed by the user) to the back-end subsystem 22.

Package Transmission

In the preferred embodiment, package transmission takes place over a conditional access controlled multicast network 24 which carries IP multicast packets and where each channel is assigned an IP multicast address. The multicast network's conditional access system 25 ensures that only subscribed receivers may access a channel's IP packets. Preferably, the multicast network 24 provides a single IP multicast address (which every receiver 26 may receive) on which the package delivery subsystem 36 sends packets announcing the upcoming transmission of packages.

In the preferred embodiment, the receiver 26 may selectively enable and disable IP multicast addresses. If an IP multicast address is disabled, the multicast receiver 54 filters packets containing the address so that the receiver 26 is not burdened with the processing associated with identifying and discarding disabled addresses.

Alternatively, if the multicast network 24 is compliant with the European Digital Video Multicast (DVB) standard, each channel may be assigned an MPEG2 transport stream and the multicast network's conditional access system 25 ensures that only subscribed receivers may access a channel's MPEG2 transport stream.

In other embodiments, more than one multicast address may be dedicated to each channel (e.g. one address for base package transmissions, one for delta package transmissions, one for control information, etc.). An address or set of addresses may also be shared by multiple channels, one address or set of addresses per package at a time. These arrangements, however, are not preferred as they complicate the conditional access system 25.

Preferably, the package delivery subsystem 36 in the back-end subsystem 22 receives the packages 34 from the web crawler(s) 30 (FIG. 3) with a schedule for each package. The schedule includes information such as when transmission should take place, the priority of the package's transmission, the speed at which the transmission should take place, whether the package should be transmitted more than once, and/or other information related to package transmission.

Figure 5:
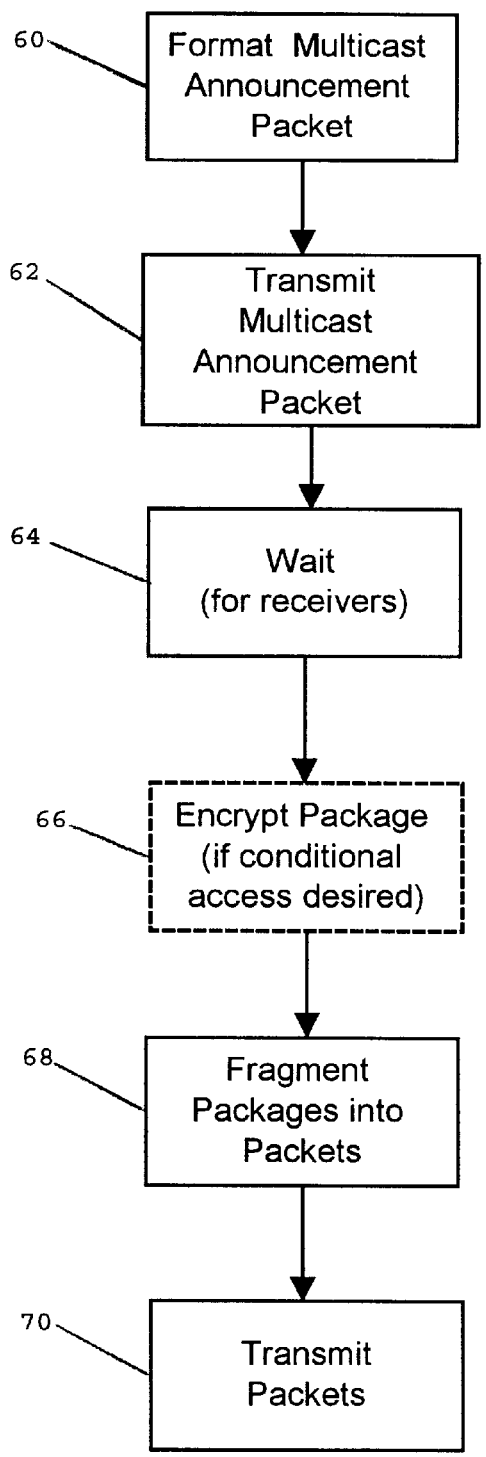
FIG. 5 is a flowchart illustrating the steps performed by the package delivery subsystem of the back-end subsystem of FIG. 3.

FIG. 5 is a flowchart illustrating the steps performed by the package delivery subsystem 36 of the back-end subsystem 22 to transmit a package 34 to the multicast network 24. If a schedule is provided with the package, the steps are performed within any schedule constraints. The package delivery subsystem (PDS) 36 first formats a multicast announcement packet identifying the package to be transmitted (block 60). The multicast announcement packet may include, for example, which channel the package is part of, what kind of package is being transmitted, information to uniquely identify one version of a package from another, and the size of the package. A PDS 36 then passes the multicast announcement packet to the multicast network 24 to be transmitted over the multicast announcement address (block 62). Preferably, the PDS 36 transmits the packet multiple times to ensure a high probability of reception.

The PDS 36 then waits a small period of time (e.g. 3 seconds) to allow the receivers 26 to determine whether the package should be received and to prepare for reception (block 64). Optionally, if conditional access is desired but is not provided by the multicast network 24, the PDS 36 uses a key or set of keys only made available to subscribed receivers to encrypt either the entire package or the individual packets (block 66).

The PDS 36 then fragments the package into a sequence of packets, wherein each packet has a unique sequence number (block 68) and begins transmitting the packets at the specified bit rate (block 70). The package delivery subsystem 36 also multicasts other information (either within the multicast announcement packets or other packets) to allow the receiver to identify the first and last packet of a package. The PDS 36 may subsequently retransmit a package's packets to increase the probability of reception. Preferably, the PDS 36 retransmits packages on a scheduled basis and only certain packages may be scheduled for retransmission. For example, base packages may preferably be transmitted 2–3 times depending on factors such as the time of day and the size of the package. Delta packages, however, may preferably be transmitted just once, as packet loss may be recovered by the subsequent transmission of the next delta package.

Package Reception

The package receiver 56 in each receiver 26 may optionally be configured to monitor receiver activity and/or user input to classify the receiver's readiness to receive packages. For example, the package receiver 56 might monitor: (i) receiver computer terminal CPU loading; (ii) receiver computer disk activity; (iii) user input (mouse clicks and/or keyboard keystrokes); and/or (iv) time of day. The user may also enter preferences of when packages should be received. For example, the user may specify that prior to starting a computer game, all package reception should be suspended until at least 30 minutes has gone by with no user input (mouse clicks or keystrokes), or until at least 30 minutes of only minimal CPU loading and disk activity. Alternatively, the user may allow only base package reception under such circumstances.

Thus, a receiver's readiness for package reception may be classified as follows:

(1) Completely suspended—the package receiver 56 will receive no packages in order to prevent interfering with other processing;

(2) Base package reception only—the package receiver 56 will receive only base packages to reduce interference with other processing; or (3) Package reception enabled—the package receiver 56 will receive any package (i.e. base or delta) of interest.

Preferably, when package reception is completely suspended, the package receiver 56 suspends reception of the multicast announcement packets by disabling their address(es). In addition, the package receiver may reduce its impact by releasing all or part of its resources (memory, threads, etc.) up to, but not including, what is necessary to monitor computer and user activity. When its "footprint" (i.e. amount of resources used when not receiving a package) is low, the package receiver 56 could silently discard all such announcements.

When package reception has either base or all package reception enabled, the package receiver 56 evaluates each multicast announcement packet to determine whether the corresponding package should be received. Reception should commence only if: (1) reception of the type of package (base or delta) is currently enabled; (2) the package has not already been successfully received; (3) the package is for a subscribed channel; and (4) disk/memory usage management permits the reception of the package (explained in detail below).

If the package receiver 56 determines that a package should be received, the package receiver 56 requests the multicast receiver 54 to enable the associated address(es). The package receiver 56 then processes the package's packets, discarding packets already received and storing previously unreceived packets in memory (i.e. writing them to disk), thus reassembling the package.

Preferably, the package receiver 56 monitors the packet sequence numbers and first and last packet indications to determine whether the entire package has been received without lost packets. The package receiver 56 identifies the end of a package's transmission by either not receiving any packets within a predetermined timeout period or by receipt of the last packet. In multicast networks that allow out-of-sequence packets, the package receiver may have to wait for another timeout period to determine that all packets have been received. If the package was received intact, the package receiver 56 makes the package available to the content viewer 58. If the package failed to be received intact, the package receiver may discard the package, preferably without interruption of or notification to other operations. Preferably, however, the set of missing packets is recorded (in some fashion) and on a repeat transmission of the packets, the "holes" are filled in by storing only missing packets. This provides a higher probability of reception on repeat transmission, but may not be necessary with some networks having a very low packet loss probability.

Preferably, while the package is being received, the package receiver 56 also optionally offers the user the opportunity to abort the reception if, for example, the receiver 56 is needed for other activities. While the package is being received, the package receiver 56 also preferably monitors user activity and computer terminal loading and aborts reception depending on previously configured user preferences.

Memory/Disk Space Management

Prior multicast systems often interfered with the normal operation of the receiver by consuming too much memory or disk space. Because the present invention's high-speed multicast network permits the transmission of larger amounts of data than low speed multicasts, there is a high probability that, without effective memory/disk space management, the packages would consume too much memory/disk space. In order to overcome this potential problem, the web crawler 30 and package receiver 56 of the present invention cooperate to manage memory usage to minimize impact on the receiver 26.

First, each channel definition 32 that is provided to the web crawler 30 includes a "memory budget" for the channel. (FIG. 3). The memory budget, which approximates the size of the channel, is used to ensure that WebCast's memory/disk usage does not exceed user expectations. The web crawler 30 ensures that the total memory space consumed by a channel does not exceed the channel's memory budget. Specifically, the web crawler 30 checks the size of each package prior to submitting it to the package delivery subsystem 36 for transmission. The web crawler 30 only submits a base package to the package delivery subsystem 36 when it does not exceed the memory budget. The web crawler 30 only submits a delta package when the delta package size plus the corresponding base package size do not exceed the memory budget.

The package receiver 56 also checks the size of a package prior to beginning its reception. The package receiver preliminarily permits reception when the size of the package plus the size of any previously received packages does not exceed the channel's memory budget. If the package size exceeds the memory budget, the package receiver checks whether deleting the channel's previously received packages will allow reception. For a base package, the package receiver deletes the channel's packages as necessary to make room for the base package. Preferably, the package receiver 56 first deletes the previous base package, then any delta packages for that previous base package and then any other delta packages as necessary. For a delta package, the package receiver preferably deletes the channel's previously received delta packages as necessary to permit reception.

Once preliminary reception of a package is permitted, the package receiver 56 checks the available space in the receiver memory 28 against a predetermined minimum memory space that is not to be used for WebCast channel storage. The package receiver only permits reception when the package will not take available memory/disk space under this threshold.

Figure 6:
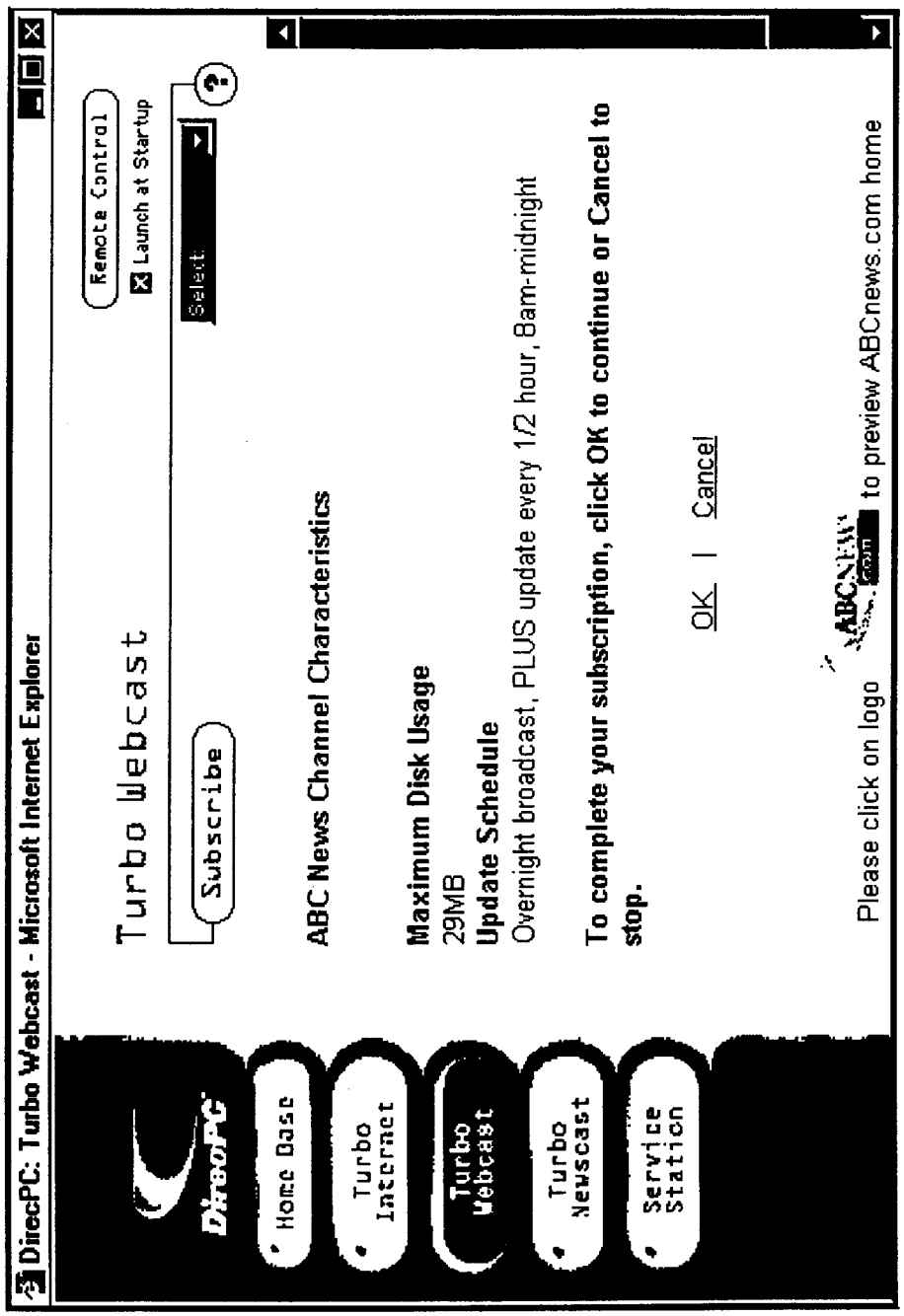
FIG. 6 is an example window of an Electronic Program Guide (EPG) that may be used to notify a user of the maximum memory space required for a channel and of the package broadcast schedule.

Preferably, the package receiver records when memory/disk space does not permit a package's reception and the content viewer 58 notifies the user of the shortage of memory space. In a preferred embodiment, the user is notified through the EPG (Electronic Program Guide). Prior to subscribing to a package, the EPG notifies the user of the memory budget for the channel and the available memory/disk space. FIG. 6 is an example of an EPG window that may be used to so notify the user. As illustrated in FIG. 6, the EPG also preferably notifies the user when reception of packages will take place. For example, base packages may be broadcast during a slow use period (such as overnight). Delta packages (containing updates) may preferably be broadcast on a periodic basis, such as every half hour. The EPG may also allow a user to specify when packages can be received.

Channel Subscription and Conditional Access

Figure 7:
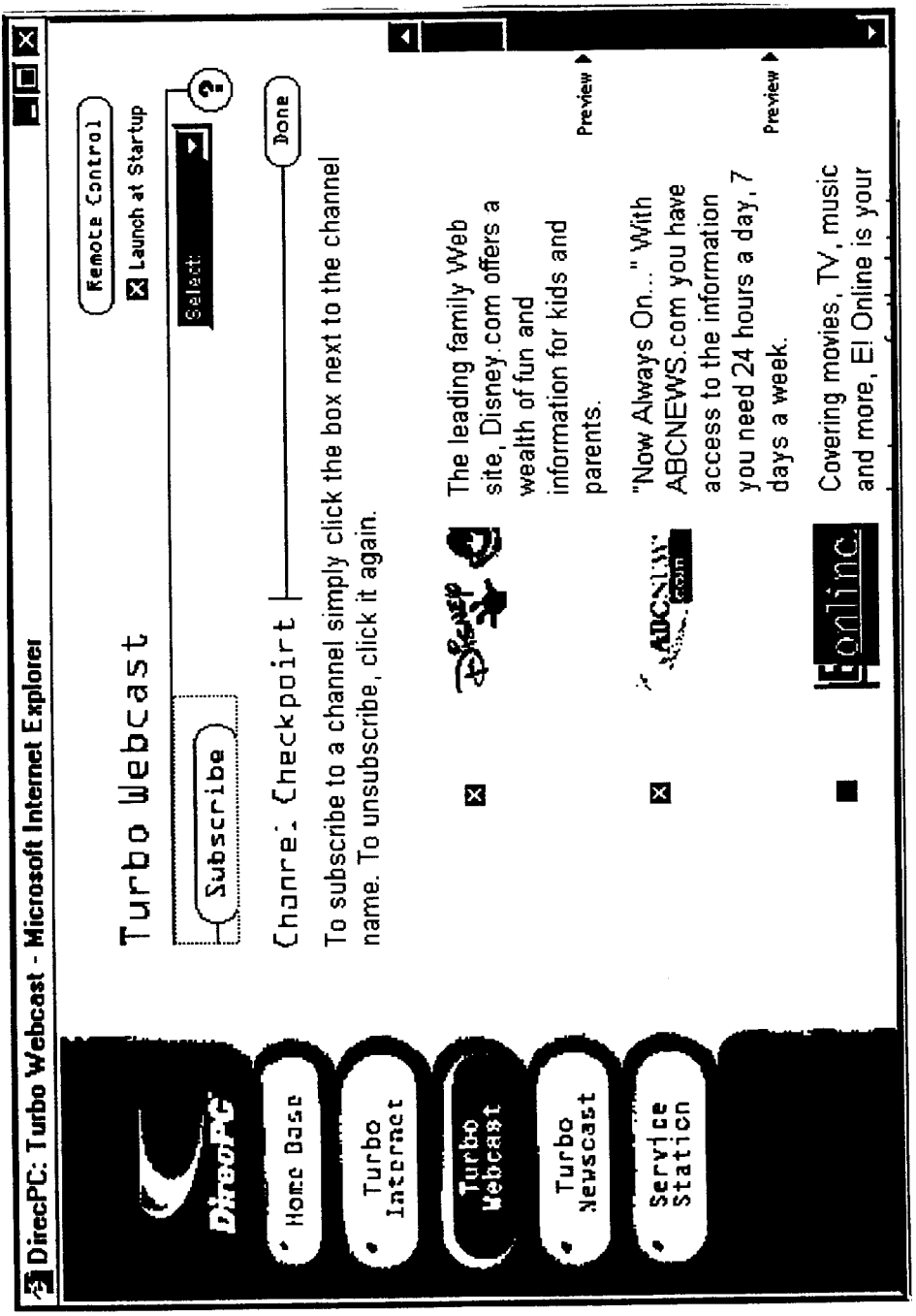
FIG. 7 is an example window of the Electronic Program Guide (EPG) which allows a user to preview the content of available channels and permits the user to subscribe or unsubscribe to the channels.

As discussed above, every user receives an Electronic Program Guide (EPG) channel. In the preferred embodiment, there is a single EPG channel. However, multiple EPG channels may be used which are specifically tailored to a user based on factors such as language, the service plan a user has selected, age, sex, etc. The EPG preferably contains promotional content of each available channel which allows a user to evaluate the channels and select which channels to subscribe to or unsubscribe from. Preferably, the EPG and its promotional content is structured like a web site—it is a collection of HTML pages with embedded graphics and other active content and a user indicates the desired channels by clicking on buttons, check boxes, etc. FIG. 7 is an example of an EPG window that may be used to notify a user of the available channels. The FIG. 7 example also allows a user to link to a preview of the channels and provides a box for the user to subscribe or unsubscribe to a channel.

When launched by the user, the content viewer 58 in the receiver 26 makes the promotional material available to the user. The content viewer 58 also processes a user's requests to subscribe to or unsubscribe a channel. If no conditional access is implemented, the content viewer 58 informs the package receiver 56 of the user's subscription/unsubscription request and the package receiver 56 starts receiving or ceases reception of the channel's packages as appropriate.

Preferably, however, a conditional access scheme is implemented in the present invention. As discussed previously, the conditional access may be implemented, for example, by the multicast network 24, by the back-end subsystem 22, or by a combination of the two.

If the conditional access is implemented by the conditional access system 25 in the multicast network 24, the content viewer 58 performs a subscribe or unsubscribe transaction against the multicast network. This is typically performed via the multicast receiver 54, which may optionally contact the head-end subsystem 52 either immediately or at a later time. For some multicast networks, the content viewer 58 may directly contact the head-end subsystem 52

(via the Internet, dialup modem connection, or any other suitable means) and perform the transaction. If the transaction is accepted, the content viewer 58 informs the package receiver 58 which, in turn, starts receiving or ceases reception of the channel's packages as appropriate. Preferably, the multicast network 24 provides the complete set of currently subscribed channels at the end of such a transaction (or upon request), thereby keeping the content viewer 58 and multicast receiver 54 synchronized with the multicast network 24. Also, the conditional access system 25 preferably uses encryption to prevent unauthorized access to a multicast address, wherein the keys used to encrypt one channel's multicast addresses are different from the keys used to encrypt other channel's multicast addresses.

Alternatively, the multicast network 24 implements the conditional access and the back end subsystem 22 performs the subscription processing. With this arrangement, the back end subsystem 22 processes transactions for channel subscriptions and unsubscriptions and the multicast network 24 controls access to multicast addresses. The content viewer 58 contacts the registration server 46 of the back end subsystem 22 (via dial-up modem, the Internet, etc.) and performs a subscribe transaction. The transaction request includes information: (i) identifying the multicast receiver that the receiver is receiving from, (ii) the channel being requested, and (iii) optionally, information used to authenticate the sender of the request.

The registration server 46 authenticates the request and, if the message is authenticated, maps the channel requested to the set of multicast addresses carrying the channel. The registration server 46 then performs a transaction against the multicast network head-end subsystem 52 requesting that the receiver 26 be given access to the addresses that carry the subscribed-to channel. The authentication is intended to verify that the request came from the content viewer 58 of the receiver 26 for which access to a channel is being requested. Preferably, the authentication is performed via password authentication. However, authentication may also be performed using public key encryption.

Once the subscription requests have been processed, the multicast network 24 is responsible for ensuring that the receivers 26 only receive packets from authorized multicast addresses. In the preferred embodiment, the conditional access system 25 in the multicast network utilizes encryption to prevent unauthorized access to a multicast address wherein the keys used to encrypt one channel's multicast addresses are different from the keys used to encrypt other channel's multicast addresses.

Alternatively, conditional access may be implemented solely by the back end subsystem 22. In this embodiment, the content viewer 58 contacts the registration server 46 (via dial-up modem, the Internet, etc) and performs a subscribe/unsubscribe transaction. The back-end subsystem 22 then makes the channel's decryption keys available to the receiver. The receiver may have to periodically perform transactions with the registration server to obtain and update encryption keys. (This optionally may be performed along with usage reporting.) If the transaction is accepted, the package receiver 56 is informed, as described above. This conditional access embodiment is typically not as secure as the conditional access system offered by the multicast network, but still provides some level of security.

In any of the above-described embodiments, multiple subscription and/or unsubscription requests may be batched together for more efficient processing.

Offline Browsing

Offline browsing refers to a user accessing web site content without connecting to the Internet. The content viewer 58 within the receiver 26 is responsible for supporting the user's offline browsing of WebCast channel content. In a preferred embodiment, the content viewer 58 comprises a proxy-server application which works with an existing (i.e. unmodified) web browser 12. This allows the user to continue to work with a popular web browser without relearning a new user interface.

In the preferred embodiment, when the user initiates an offline browsing session, the content viewer 58 first determines whether the web browser 12 is running and, if so, prompts the user to close the browser. If the browser is not running, the content viewer 58 configures the browser to access the Internet via the content viewer/proxy-server. The content viewer/proxy-server then launches the browser to display the Electronic Program Guide (EPG). At the end of an offline browsing session, the content viewer/proxy-server 58 closes the browser 12 and reconfigures the browser to its original, unproxied configuration.

In another embodiment of the invention, the content viewer 58 is integrated with a browser's cache so that the browser requests URLs from the content viewer 58 prior to requesting them across the network.

In either embodiment, once the content viewer 58 has initialized, it receives requests for URLs from the browser 12 and attempts to find them from its "cache" of URLs. The cache consists of the URL data items contained within the received packages from subscribed channels. From the standpoint of the content viewer 58 performing a cache lookup, a URL consists of two parts. For example, the URL "http://www.direcpc.com/users/index.html" illustrates these two parts:

(1) "http://www.direcpc.com"—the first part identifies the protocol (which is always http) and the domain name of the web server from which the URL is being requested;

(2) "/users/index.html"—the second part identifies the pathname (directory and filename) of the URL within the web server's file system.

The content viewer 58 performs a cache lookup by first performing a domain name lookup. The content viewer 58 maintains a data structure that maps a domain name to the list of channels which contain URLs from the domain name. In a preferred embodiment, this data structure is a hash table, wherein each hash entry is a list and each list entry contains a domain name and a channel ID. (As is known in the art, a hash table provides an efficient method of information retrieval from an array. Use of a hash table allows many of the different possible entries (or keys) that might occur to be mapped to the same location in the array under the action of an index function.) Preferably, the content viewer 58 constructs this data structure from the supplemental information within each package listing the domain names of URLs included in the package. The content viewer 58 extracts the domain name from the URL and determines from this data structure the list of channels which might contain the URL.

The content viewer 58 next performs a URL lookup, wherein the content viewer takes the list of candidate channels (determined from the domain name lookup) and check's each channel's packages until a match is found. Preferably, the content viewer 58 first checks a channel's delta package (if available) for a match and then its base package.

In some instances, a URL may exist in more than one channel's packages. To handle this, in a preferred embodiment, the content viewer 58 checks channels starting with the most recent crawl start time. (A channel's start time is recorded in its package's supplemental information.) Upon finding the URL in a package, the content viewer 58 retrieves the URL data item from the package from memory 28 and decompresses the URL data item, if necessary. If the URL data item is difference compressed, the content viewer retrieves the URL data item from both the base and delta packages (decompressing as necessary) and performs difference decompression to restore the revised URL's content.

In many cases, the present invention is used with a receiver 26 having a switched connection to the Internet, such as a home computer running Windows95® with a dialup modem telephone connection to the Internet. The telephone line is often used both for Internet access and for ordinary telephony services (POTS). Another example is an ISDN switched connection. In addition to being a shared resource, where the receiver may interfere with other use of the connection, a switched connection to the Internet is frequently metered so that a user incurs an additional expense with each use.

In such switched connection situations, it is desirable that the receiver share the telephone line with other users. In a preferred embodiment, the content viewer 58 interacts with the user to allow "seamless" access to content outside of the channel definition while controlling access to the phone line in a way which permits sharing the phone line with other users. The content viewer does this by controlling "cache misses."

A "cache miss" occurs when the browser 12 requests a URL which is not within any of the packages that have been received and stored in memory 28. The requested URL may not be present in a received package because, for example, a cached web page may reference URLs which were not crawled and incorporated into a channel. This may occur either due to Internet outages during the crawling or because the web page contained dynamic content which could not be automatically crawled. In this instance, there are often several cache misses within a short period of time, one for each missing embedded URL.

The requested URL may also not be present if the user clicked on a link from a page within the channel definition which references a page outside of the channel definition. For example, if the channel definition defined a search depth of two levels, and the user requested a URL that was three levels deep, a cache miss would occur. A cache miss may also occur if the user directed the browser to a URL which is not present in the cache.

Figure 8:
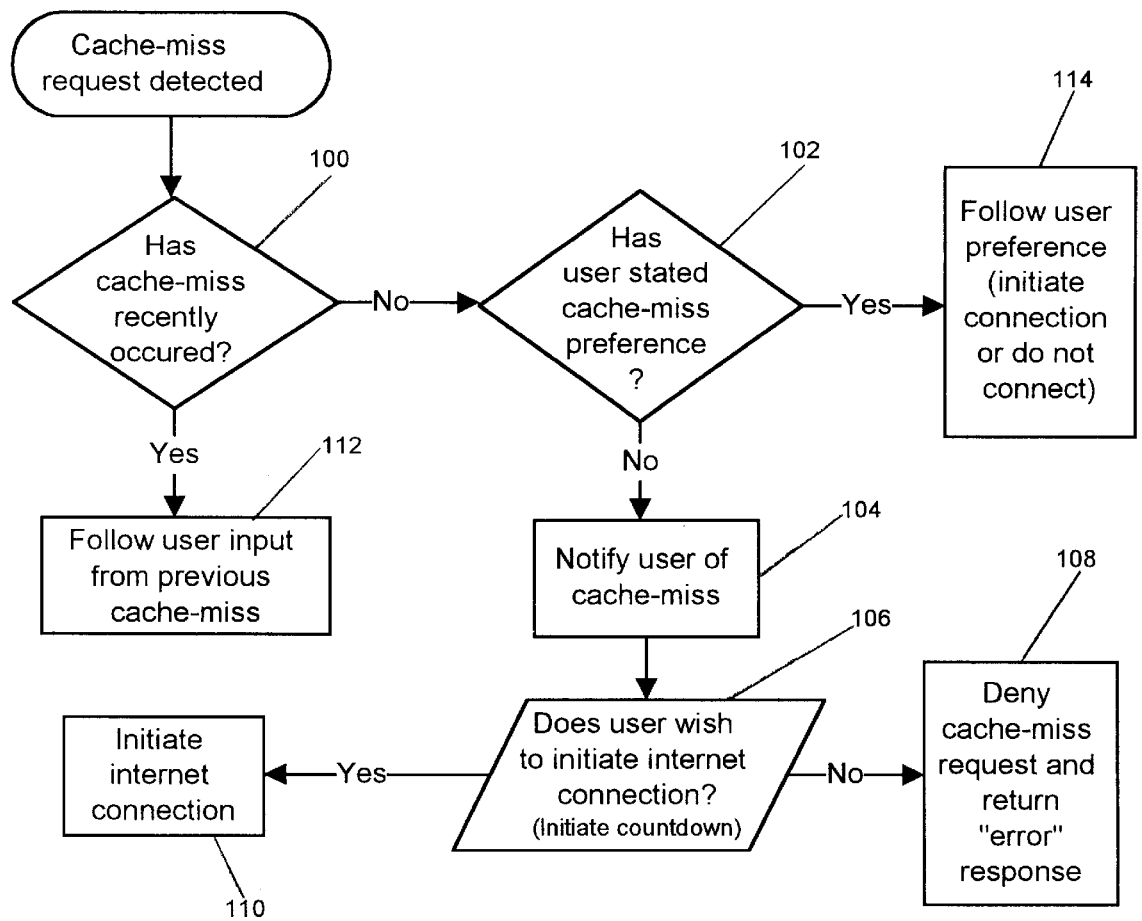
FIG. 8 is a flowchart illustrating the steps performed by the content viewer of the receiver of FIG. 2 when a "cache miss" occurs.

Preferably, when a cache miss occurs, the content viewer 58 notifies the user and allows the opportunity for the user to connect to the Internet (via the switched connection) to obtain seamless access to uncached web pages. FIG. 8 is a flowchart of the steps performed by the content viewer 58 when a cache miss occurs. The content viewer 58 first determines whether another cache miss has recently occurred (block 100). If not, it then determines whether the user has previously specified how a cache miss should be treated (block 102). If no user preferences are specified, the content viewer 58 notifies the user that a cache miss has occurred and that the requested content can only be obtained by accessing the Internet (block 104).

Figure 9:
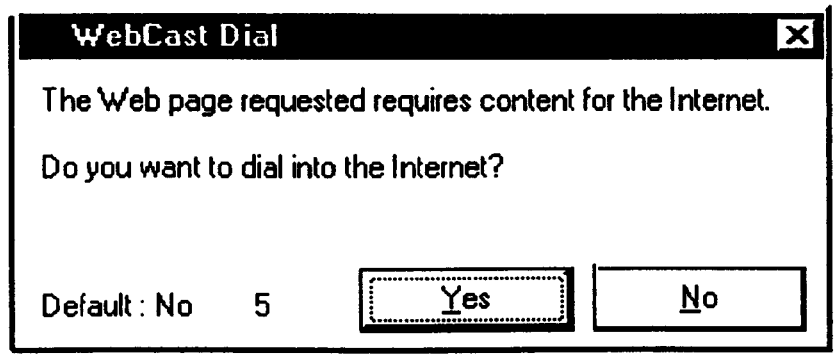
FIG. 9 is an example of a dialog box generated by the content viewer to notify the user of a cache miss and query the user whether a connection to the Internet should be established.

The content viewer 58 then queries the user whether they want to initiate a connection to the Internet to retrieve the requested content (block 106). This query prevents an automatic connection to the Internet that may interfere with other uses of the connection (i.e. interrupt a telephone call) or may incur undesired charges. If other cache miss occurs while waiting for a response to the query, the content viewer 58 holds the cache misses until the user responds. The block 106 also optionally initiates a countdown along with the query that lets the user know that they have N seconds to respond to the query. FIG. 9 is an example of a dialog box that may be used to notify the user of the cache miss and queries the user about connecting to the Internet. The example of FIG. 9 also includes the optional countdown.

Referring back to FIG. 8, if the user responds that they do not wish to connect to the Internet or if the countdown expires with no user response, the content viewer 58 denies the cache miss request by providing an indication to the browser 12 that the content can only be obtained by connecting to the Internet (block 108). In a preferred embodiment, the content viewer returns an "error" HTTP response containing a text or HTML body (or a redirection to an HTML page) which contains text explaining that the content can only be obtained via the Internet. This results in the browser 12 displaying this text (or HTML page) to the user.

Alternatively, if the user responds that they wish to access the requested content by connecting to the Internet, the content viewer initiates the Internet connection (block 110). In a preferred embodiment, the content viewer 58 acts as a normal proxy-server and initiates TCP connections to the requested URL's server and to the servers of other requested URLs from cache misses which were held while waiting for the user response. Upon receiving such a connection initiation, the receiver 26 may then be configured to automatically initiate a switched connection to the Internet. In other embodiments, the content viewer 58 may interact with the switched connection's device driver to initiate a connection and hold all URL requests until after the connection to the Internet has been established.

Referring back to the block 100, if the content viewer 58 determines that another cache miss has recently occurred, it follows the input given by the user for the previous cache miss and either initiates an Internet connection (block 110) or denies the request (block 108). The blocks 110–112 prevent the user from being "peppered" with cache miss queries, which may occur frequently in web pages with more than one missing embedded URL.

Similarly, if the content viewer determines that the user has indicated a preference for cache miss requests (block 102), it follows that preference (block 114) and either initiates the connection (block 110) or denies the request (block 108).

Usage Reporting

The present invention provides sufficient usage information to a web site to support an advertising-based business model while requiring no change to a web site's operation. Alternatively, usage information may be reported to another source, such as a network operations center (NOC). Specifically, the present invention may report usage information to the web site as if the user were accessing the web site via a conventional caching proxy-server. Alternatively, the present invention may report usage information to the web site in the form of log files.

Figure 1:
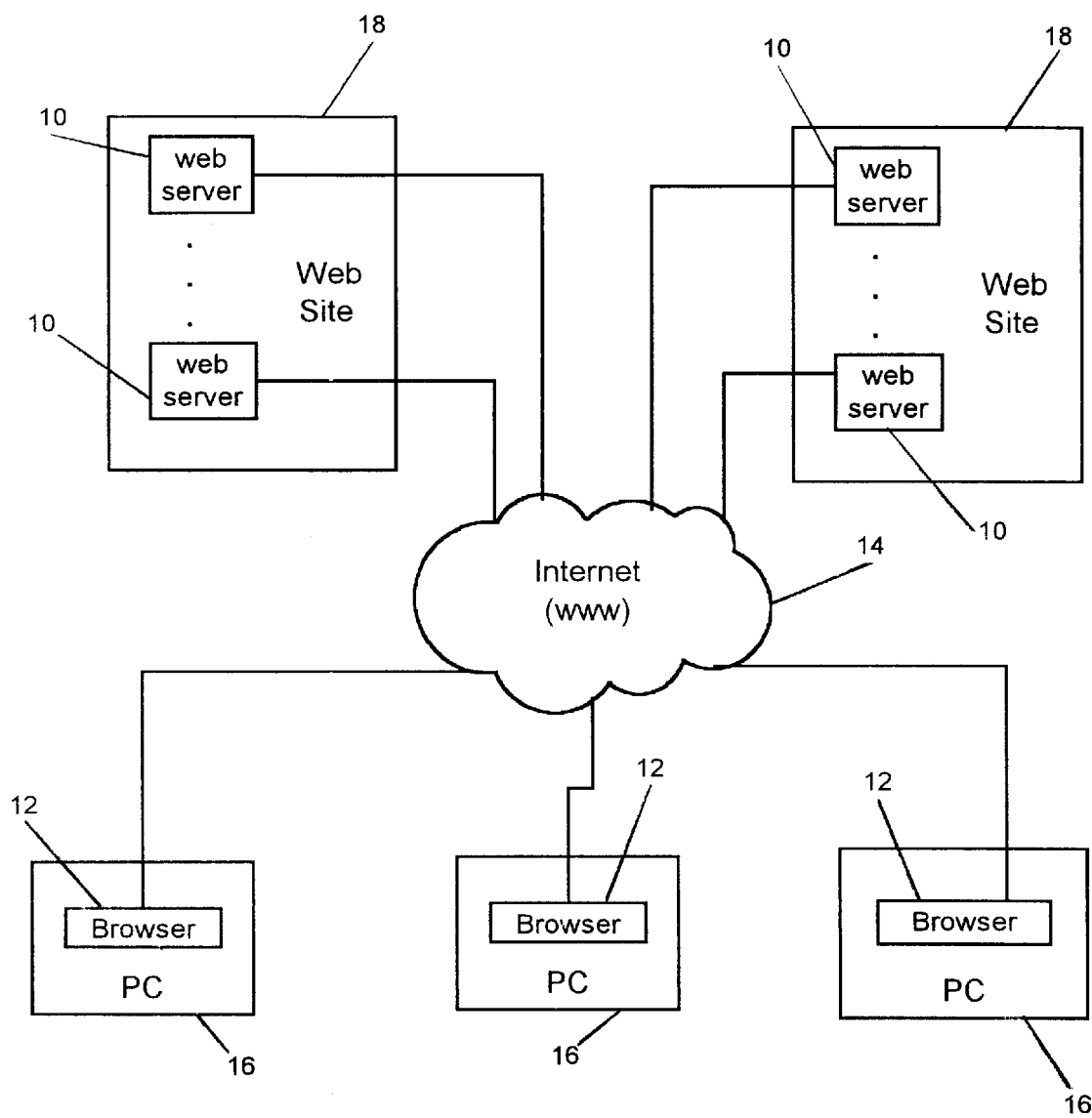
FIG. 1 is a simplified block diagram of a prior art method for accessing information from the Internet.

Generally, a web browser 12 sends to a web server 10 a separate request for each URL which a user views. (FIG. 1). A request for a URL is called a "hit". To generate advertising revenue, a web site typically records for each advertisement URL the number of "hits" (i.e., the number of times the site has served the URL). The web site receives advertising revenue based on either: (i) the actual number of "hits" the site receives, or (ii) a forecast of the number of "hits" that advertisement can be expected to receive based on past experience.

A web site is typically unable to determine the identity (i.e., name, address, phone number, etc.) of the users visiting the site. However, a web site is able to tell which URLs are being accessed over time (i.e., weeks and months) by the same user. The web site collects this information by assigning each different browser requesting URLs from the site a unique "cookie". (As is known in the art, a "cookie" is a piece of limited, internal information transmitted between a web server and a web browser which uniquely identifies the user without revealing the identity of the user.) It is important, in order to maintain advertising revenue, for a web site to be able to tell which "hits" are being received from the same user. The present invention provides such information to the web sites through use of the cache hit tracker 40 in the back-end subsystem 22. (See FIG. 3.)

Figure 10:
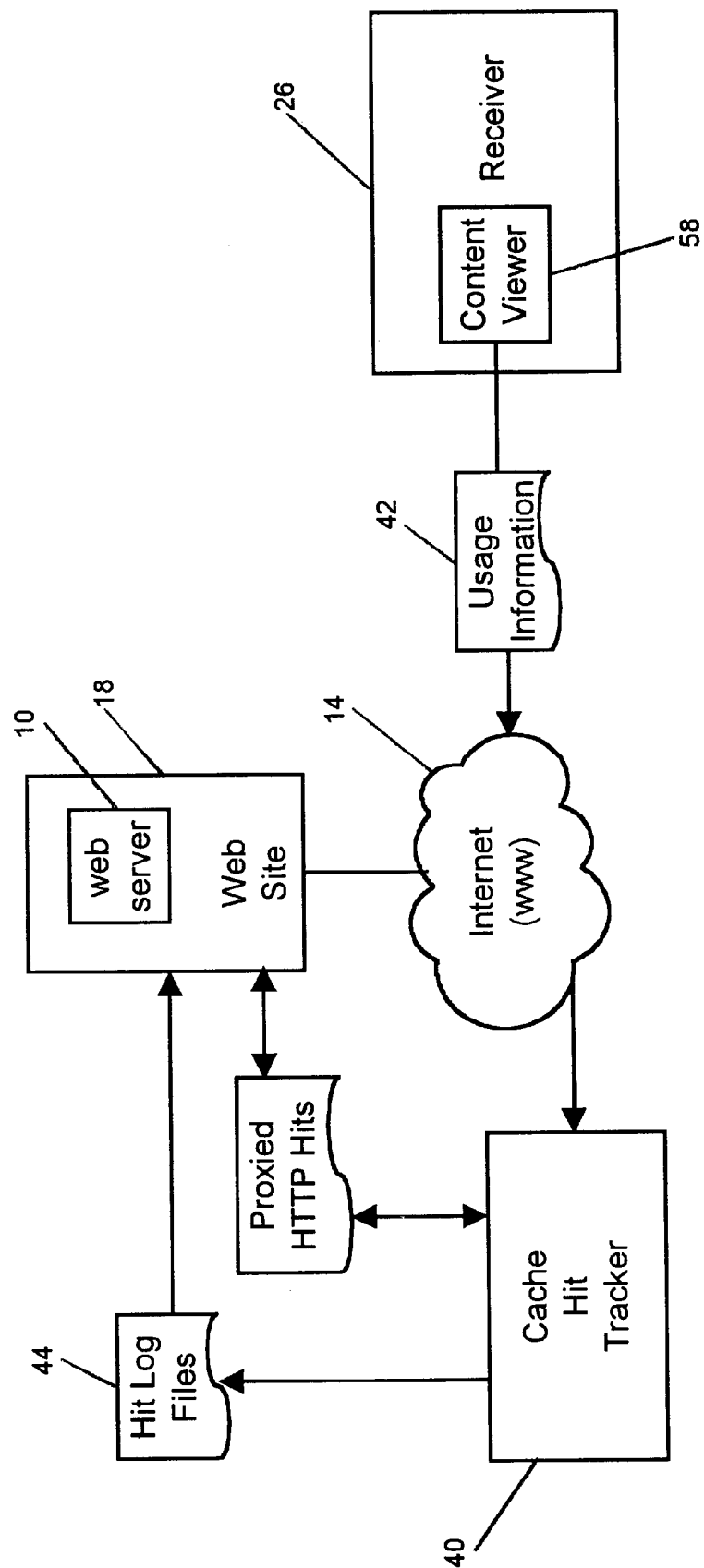
FIG. 10 is a block diagram illustrating the usage reporting function of the present invention.

Referring also to FIG. 10, the content viewer 58 in the receiver 26 sends usage information 42 to the back-end subsystem's cache hit tracker(s) 40 as specified by the various channel's channel definitions. The hit tracking part of the channel definition is delivered to the receiver 26 within a package's supplemental information. In a preferred embodiment, the usage information consists of a separate record for each "hit," wherein only a subset of the cache hits are reported. This usage information is preferably reported via a TCP/IP network, such as the Internet 14, and the receiver's interface to the Internet may be via a switched connection such as dialup modem connection. It is understood, however, that the usage information could be reported via any other suitable connection.

The present invention returns usage information to a web site (or other location) on a per channel basis either by proxy (which requires no change to web site operation) or by log files (which requires no change to web site operation other than simply acquiring and processing the log files). With proxy reporting, the cache hit tracker 40 preferably operates (from the web servers' perspective) as an HTTP proxy server. The cache hit tracker 40 stores reported "hits" from the content viewer 58 in the receiver 26 and subsequently performs a HTTP operation for each reported URL. This minimizes the time that the receiver 26 needs to be connected to the Internet 14 as it is not delayed while its hits are reported to the web servers 10. The type of HTTP operation performed by the cache hit tracker 40 is defined by the channel definitions, which are sent along with the usage reports 42 to the cache hit tracker 40. Specifically, the following HTTP operations may be configured to perform proxy usage reporting on a per channel basis:

(1) GET—The cache hit tracker 40 may perform an HTTP GET operation (which, generally, transfers URL data item from the web server 10 to the cache hit tracker 40.) The cache hit tracker 40 then waits for all the data to be received, but discards the data as it is received. This operation most closely matches what the web server 10 would have received had the user directly retrieved the URL data item without use of the present invention.

(2) GET no wait—The cache hit tracker 40 may perform an HTTP GET operation Oust as above) but waits only for the HTTP response header to be received from the web server 10. Once received, the cache hit tracker 40 immediately closes the connection. This operation uses less network bandwidth, as the actual URL data item need not be completely transferred.

(3) GET If Modified Since—The cache hit tracker 40 may perform a GET If-Modified-Since HTTP operation, wherein the last-modified data comes from the HTTP response header included with the URL in the package. This operation also reduces network utilization, as the full content would not typically be sent, while completing the HTTP operation.

(4) GET If Modified Since No Wait—The cache hit tracker 40 may perform a GET If-Modified-Since operation (as above), but does not wait for any data after the response from the web server 10 that the URL has changed and should be sent. This operation uses less network bandwidth, as the actual URL data item is not transferred.

The cache hit tracker 40 may also perform usage reporting using log files 44. In this method, the cache hit tracker 40 stores reported hits in log files 44, preferably maintaining separate log files for each channel. The cache hit tracker 40 either makes the log files 44 available to the web site (via, for example, an FTP GET operation) or periodically delivers the log files 44 to the web site (via, for example, an FTP PUT operation or e-mail).

In a preferred embodiment, each hit log file 44 is a flat ASCII file, with one record per line and a fixed number of fields per record. All fields are space separated and fields which may contain spaces are enclosed in quotes(""). Table 2 below specifies the preferred format of the hit log file 44.

TABLE 2

| Field Name | Field Format | Description |
|---|---|---|
| ChannelID | Four (4) alphanumerics | Identifies the channel this hit came from |
| URL | "printable ASCII" (enclosed in quotes) | The URL from the HTTP request's Request Line |
| UserAgent | "printable ASCII" (enclosed in quotes) | From the HTTP request's User-Agent line. If the User-Agent line is not present, the field is "NOAGENT" |
| HitTime | YYYYMMHHMMSS | GMT timestamp of when the user accessed the requested URL data item from the cache |
| ReportDelay | Eight (8) numerics | Duration (in seconds) from when the cache hit occurred to when the hit was reported (either to the originating server or the file) |
| EditionID | RRR.MMM | An ID which uniquely identifies the snapshot of the channel's content given to the user. (RRR is the three least significant digits (LSD) of the base package edition # and MMM is the three LSDs of the delta package edition #.) |
| SiteID | Ten (10) alphanumerics | Uniquely, but anonymously, identifies the user |
| HitMethod | Four (4) alphanumerics | Identifies how the hit should be relayed to the web server. Will contain one of: FILE - sent in log file GETN - complete HTTP GET operation GETR - HTTP GET No Wait (connection closed after response header is received) GETI - HTTP Get If Modified Since (default) GITR - HTTP Get If Modified Since No Wait (connection closed after response header is received) |

In the preferred hit log file format of Table 2, the "SiteID" field provides the web site with a rough equivalent to a "cookie" (discussed above) in that it allows hits from a single user to be identified, without revealing the identity of that user. The following is an example of a hit log file record (in an actual log file the record occupies a single line):

EONL "http://www.hns.com/index2.html" "Mozilla/2.0 (compatible;

MSIE 3.0; Windows 95)" 19770723164419 00002000 146.001 09AKLM5823 FILE

The channel definition for each channel dictates whether all hits or a filtered subset of hits should be reported. Filtering the reported hits minimizes unnecessary processing in the web server (and connect time for the user), while retaining reporting information for advertising and other critical hits. Filters are typically established to filter out "insignificant hits" and report only advertising-related hits and HTML hits, thereby allowing a web site to tally advertising statistics and page popularity. The filters that may be used to reduce the reporting of insignificant hits include:

(1) Content Filters—Content filters may be used, for example, if all advertisements are in the form of .gif (graphics interchange format) images. A content filter would detect and report all .gif image URLs and would filter out most non-.gif (i.e. non-advertisement) URLs.

(2) URL Filters—URL filters may be used, for example, if all advertisements have URLs that contain "/ads/" in their URL. Thus, a "URL contains '/ads/'" filter would detect and report all hits with a URL containing "/ads/" and would filter out other (i.e. non-advertisement) URLs. Variations of such a URL filter may include a "URL StartsWith" filter, a "URL Ends With" filter, or a "URL matches a regular expression" filter, etc.

The channel definition also defines under what circumstances the receiver should report usage information for that channel. For example, the receiver may report usage information for a channel at the end of an offline browsing session or on a periodic basis (overnight, weekly, monthly, etc.) These two methods are referred to as "session end reporting" and "periodic reporting," respectively. Alternatively, usage information may be reported on demand or at any other times.

A WebCast channel generally contains just a subset of a typical web site's content. As discussed above in connection with FIG. 8, when a user requests access an uncached URL (a cache miss), the content viewer 58, at the user's discretion, may connect the receiver 26 to the Internet and access the URL directly from the web server 10. This direct connection allows the web server 10 to track such hits as it normally would with any Internet user. Thus, the cache miss feature of the present invention further allows a web site to retain its tracking of "click-thrus", i.e., cases where a user clicks on to link to a web site which provides additional information. Advertisements contained within a web site, for example, often contain links to a web site providing additional information on the advertised products. This is important because advertising revenue is sometimes based not only on the number of users to view an advertisement, but also on the number of users that "click-thru" for further information on the advertised product. By providing "seamless" or automatic access to URLs outside of the channel definition, the present invention preserves this important form of advertising revenue. However, in such a situation, it is desirable that usage reporting does not interfere with other uses of the switched connection and does not incur excessive connection charges.

Utilizing both session end and periodic reporting helps meet these goals. Channels are configured for session end usage reporting when getting usage reports in close to real-time is more important than minimizing the number of usage reporting connections. Channels are configured for periodic reporting when minimizing connection charges is important. Usage reporting can be concentrated into one connection per week by configuring all channels for weekly reporting. The usage reporting for all channels can also be scheduled for the same range of time.

With periodic reporting, usage reporting is optimized to minimize the number of connections to the Internet. This is done by waiting as long as possible to send in usage information and to "piggyback" usage reports to any other connection to the Internet which might take place in the meantime. ("Piggyback" refers to sending the usage information along with other information.)

With periodic reporting, it is desirable to balance the reporting of content so that the cache hit trackers are not overloaded. A receiver receives a usage reporting time range (e.g. every night between midnight and 5 am) and, for each channel, a usage connection timeout value, indicating the maximum time that usage information should wait prior to being reported. This timeout may have, for example, a default of five days. The receiver picks a random time within the usage reporting time range and, at that time, checks whether a usage reporting connection should be made. A connection should be made if any channel's usage information is older than the channel's usage connection timeout. When such a connection is made, all pending usage information is reported.

In a preferred embodiment, the receiver "piggybacks" usage reporting on other Internet connections by first receiving a piggyback timeout and a usage reporting retry timeout. The receiver also maintains a usage reporting time which is either disabled, running or expired. The receiver monitors the Internet connection. When the receiver connects to the Internet, the receiver initializes the usage reporting timer to timeout after the piggyback timeout and starts the timer. When the receiver disconnects from the Internet, it disables the usage reporting timer. When the usage reporting timer expires, the receiver checks if there is any usage information ready to be reported and, if there is, the receiver attempts to report it. When the report either succeeds or fails, the receiver checks the connection, and if still connected, the receiver initializes the usage reporting timer to timeout after the retry timeout period and starts the timer.

Thus, with periodic reporting, an extra connection to the Internet for usage reporting only occurs if the user connects to the Internet less than once during the usage connection timeout value (e.g. 5 days).

With session end usage reporting, the reporting normally takes place at the end of an offline browsing session. If the user indicates at that time that usage should not be reported, (because, for example, the phone line is already occupied), the usage report is stored until the start of the next offline browsing session. Thus, at the start of each offline browsing session, the content viewer 58 checks if there is a session end usage report pending from a previous offline browsing session. If so, the content viewer 58 prompts the user for permission to report the usage information and only allows offline browsing to commence after permission is received and the usage has been reported. Once session end usage has been reported, the content viewer 58 will immediately thereafter report any pending periodic usage, as this may eliminate the need for a separate periodic usage report connection.

Figure 12:
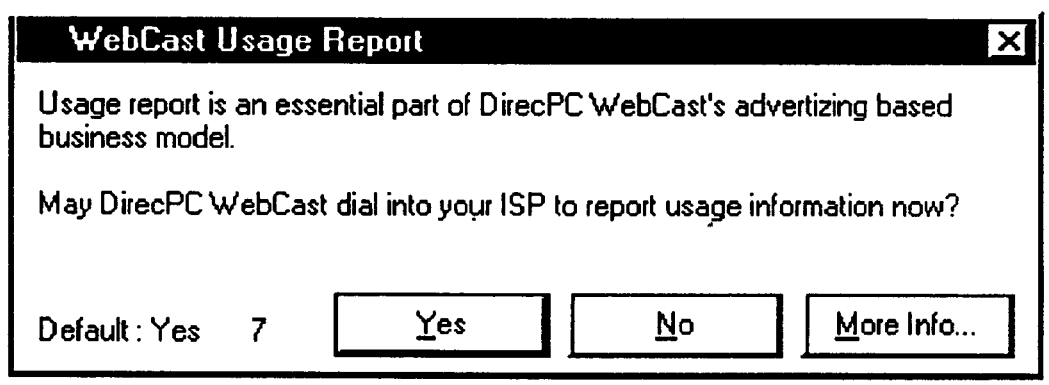
FIG. 12 is an example of a dialog box generated by the content viewer to request permission from a user to connect to the Internet to report usage information.
Figure 11:
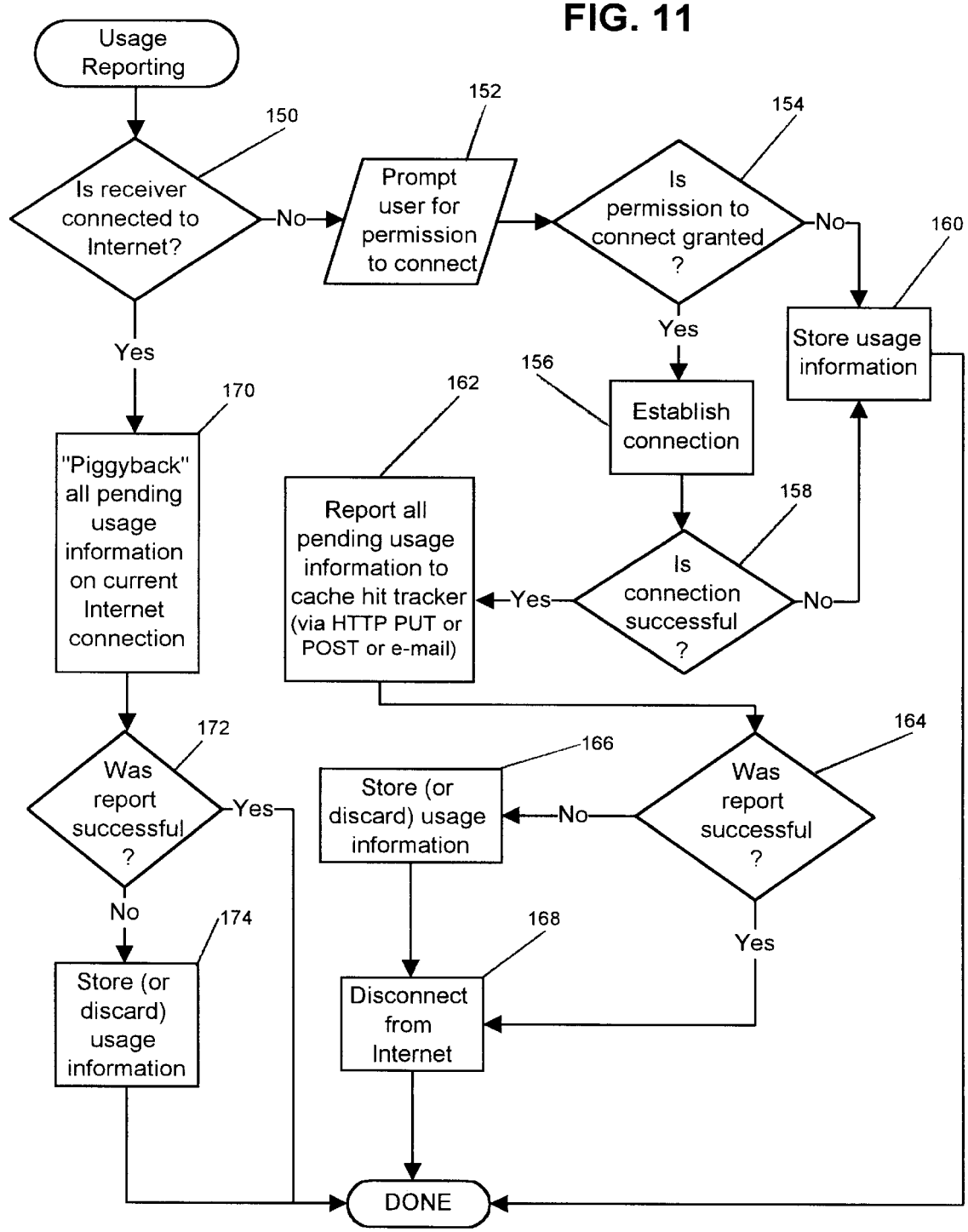
FIG. 11 is a flowchart illustrating the steps performed by the content viewer of FIG. 7 to report usage information.

FIG. 11 is a flowchart illustrating the steps performed by the content viewer 58 in the preferred embodiment for either session end or periodic usage reporting. Once the content viewer has determined that usage reporting should be initiated, it determines whether the receiver 26 is already connected to the Internet (block 150). If not, it prompts the user for permission to connect to the Internet to facilitate usage reporting (block 152). This prevents usage reporting from interfering with other receiver applications. Preferably, the content viewer 58 also initiates a countdown for the user to respond. FIG. 12 is an example of a dialog box used to prompt the user for permission to connect to the Internet for usage reporting. The FIG. 12 example also includes the optional countdown.

Referring back to FIG. 11, the content viewer then determines whether the user granted permission to connect (block 154). If permission was granted (or if the user failed to respond within the specified time period), the content viewer 58 attempts to establish a connection to the Internet (block 156).

Next, the content viewer determines whether the connection was successful (block 158). If the attempt to connect failed, or if the user denied permission to connect, the content viewer stores the usage information for reporting at a later time (block 160) and the program terminates. If the connection was successful the content viewer reports all pending usage information to the cache hit tracker 40 (block 162). The content viewer preferably reports the usage information in the form of a sequence of HTTP PUT or HTTP POST operations. These HTTP operations are preferable because they are almost always allowed to pass through any firewalls onto the Internet. However, the usage information could also be reported via e-mail, which allows information to be transmitted in nearly any kind of system. Preferably, each HTTP PUT or POST operation (or e-mail transmission) contains a block of usage information for multiple hits, which allows for more efficient transmission of usage information by reducing usage reporting connection time.

The content viewer then determines whether the report was successful (block 164). If not (for example, if the HTTP PUT operation fails), it stores the usage information to be reported at a later time (block 166). It may also determine whether there have been several reporting attempts and, if so, may discard the usage information (block 166). After the usage information has been stored or discarded (block 166), or if the content viewer determines that the report was successful (block 164), the content viewer disconnects from the Internet (block 168).

Alternatively, if the content viewer 58 determines that the receiver is connected to the Internet (block 150), it "piggybacks" all pending usage information onto the current Internet connection (block 170), as discussed above. The content viewer then determines whether the report was successful (block 172). If not, the content viewer either stores or discards the usage information (block 174), as described above in connection with block 166. If the report was successful or after the usage information is stored or discarded, the program terminates.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the system may be varied substantially without departing from the spirit of the invention, and the exclusive use of all modifications which are within the scope of the appended claims is reserved.

What is claimed is:

1. An apparatus that transmits content organized into channels, wherein a channel's content includes a plurality of URL data items and each URL data item is addressed by a URL, the apparatus comprising:

means for scheduling the assembling of a channel's content;

means for assembling the channel's content; and means for multicasting the assembled content of the channel.

2. The apparatus of claim 1, wherein the means for multicasting the assembled content of the channel includes means for transmitting the assembled content of the channel to a multicast receiver of a multicast network.

3. The apparatus of claim 1, wherein the packets are multicast to a plurality of receivers.

4. The apparatus of claim 3, wherein a channel's content includes indexing information separate from the URL data items which allows URL data items contained within the channel's content to be looked up by the receiver which receives the channel's content.

5. The apparatus of claim 4, wherein the channel's content further includes a data structure containing each domain name present in the URLs of the URL data items within the channel's content.

6. The apparatus of claim 1, further comprising:

means for scheduling a configurable number of retransmissions of a channel's previously assembled content, wherein said multicasting means fragments into packets and multicasts the channel's content according to the schedule;

the means for specifying a transmission rate of a channel's content, wherein the packets containing the channel's content are multicast at the specified rate;

means for assigning one or more multicast addresses to an announcement transmission, wherein the announcement transmission includes an announcement of an upcoming transmission of a channel's content; and means for multicasting the announcement transmission prior to the multicast of the packets containing the channel's content.

7. The apparatus of claim 1, wherein the means for assembling the channel's content further comprises:

means for assembling a base package of the channel's content, wherein the base package contains each URL data item in the channel; and means for assembling a delta package of the channel's content, wherein the delta package contains URL data items which have changed or are new since the previous assembling of the base package, and wherein said means for assembling a delta package comprises means for difference compressing a subset of the URL data items in a channel's content which is present in both the delta package and the previous base package.

8. The apparatus of claim 1, further comprising:

means for assigning one or more multicast addresses to an announcement transmission, wherein the announcement transmission includes an announcement of an upcoming transmission of a channel's content; and means for multicasting the announcement transmission prior to the multicast of the channel's content.

9. An apparatus that transmits content organized into channels, wherein a channel's content includes a plurality of URL data items and each URL data item is addressed by a URL, the apparatus comprising:

means for scheduling the assembling of a channel's content;

means for assembling the channel's content;

means for compressing a subset of the URL data items, wherein each URL data item is compressed individually independent of other URL data items such that each compressed URL data item can be decompressed without decompressing other URL data items;

means for fragmenting the channel's content into packets;

means for multicasting the packets;

wherein said means for assembling the channel's content comprises (a) means for assembling a base package of the channel's content, wherein the base package contains each URL data item in the channel, and (b) means for assembling a delta package of the channel's content, wherein the delta package contains URL data items which have changed or are new since the previous assembling of the base package; and wherein said means for assembling a delta package comprises means for difference compressing a subset of the URL data items in a channel's content which is present in both the delta package and the previous base package.

10. The apparatus of claim 9, wherein the URL data items are compressed with a lossless data compression algorithm.

11. The apparatus of claim 9, wherein the means for scheduling the assembling of the channel's content comprises means for scheduling the assembling of the base package and means for scheduling the assembling of the delta package.

12. The apparatus of claim 9, wherein the difference compression means further comprises:

means for dividing a URL data item in the delta package into sections; and for each section, means for placing into a compressed version of the URL data item, one of a reference to where that section can be found in the base package, or the section of the URL data item from the delta package.

13. The apparatus of claim 9, further comprising means for assembling a second delta package which contains a subset of the URL data items which have changed or are new since the assembling of the previous delta package.

14. The apparatus of claim 9, further comprising means for encrypting a subset of a channel's packets prior to transmission, wherein the encryption means encrypts either all or part of the packet and wherein each channel's packets are encrypted with a set of encryption keys which are unique to that channel.

15. An apparatus that transmits content organized into channels, wherein a channel's content includes a plurality of URL data items and each URL data item is addressed by a URL, the apparatus comprising:

means for assembling a base package of a channel's content, wherein the base package contains each URL data item in the channel;

means for multicasting the base package to a plurality of receivers;

means for assembling a delta package of a channel's content, wherein the delta package contains URL data items which have changed or are new since the previous assembling of the base package; and means for multicasting the delta package to the plurality of receivers, wherein said means for assembling a delta package comprises means for difference compressing a subset of the URL data items that are present in both the delta package and the previous base package.

16. The apparatus of claim 15, wherein some of the receivers comprise a personal computer.

17. The system of claim 15, wherein some of the receivers comprise a set top box.

18. The apparatus of claim 15, further comprising means for scheduling the assembling of base packages and delta packages, wherein the base packages and delta packages are assembled according to the schedule.

19. The apparatus of claim 15, further comprising means for scheduling the multicast transmission of base package packets and for scheduling subsequent periodic multicast transmission of delta package packets, wherein the base package packets and delta package packets are multicast according to the schedule.

20. The apparatus of claim 19, wherein base package packets are scheduled for transmission at a time when the receiver is not likely to be in use for other applications.

21. The apparatus of claim 20, wherein the base package packets are scheduled for transmission late at night or early in the morning.

22. The apparatus of claim 15, further comprising means for compressing a subset of the URL data items in the base and delta packages, wherein each URL data item is compressed individually independent of other URL data items such that each compressed URL data item can be decompressed without decompressing other URL data items.

23. The apparatus of claim 22, wherein the URL data items are compressed with a lossless data compression algorithm.

24. The apparatus of claim 22, wherein the difference compression means further comprises:

means for dividing a URL data item in the delta package into sections; and for each section, means for placing into a compressed version of the URL data item, one of a reference to where that section can be found in the base package, or the section of URL data item from the delta package.

25. The apparatus of claim 24, further comprising means for compressing a subset of the previously difference compressed URL data item with a lossless data compression algorithm.

26. A method for multicasting content organized into channels, wherein a channel's content includes a plurality of URL data items and each URL data item is addressed by a URL, the method comprising the steps of:

scheduling the assembling of each channel's content;

assembling each channel's content according to the schedule;

transmitting the assembled content via a multicast network to a plurality of receivers.

27. The method of claim 26, wherein a channel's content includes indexing information separate from the URL data items which allows URL data items contained within the channel's content to be looked up by the receiver which receives the channel's content.

28. The method of claim 27, wherein the channel's content further includes a data structure containing each domain name present in the URLs of the URL data items within the channel's content.

29. The method of claim 26, further comprising the steps of:

scheduling a configurable number of retransmissions of a channel's previously assembled content;

fragmenting into packets and transmitting the channel's content to the receivers according to the schedule;

specifying a transmission rate of a channel's content, wherein the packets containing the channel's content are transmitted at the specified rate; and assigning one or more multicast addresses to an announcement transmission, wherein the announcement transmission includes an announcement of an upcoming transmission of a channel's content; and transmitting the announcement transmission to the receivers prior to transmitting the packets containing the channel's content.

30. The method of claim 26, wherein the step of assembling the channel's content further comprises:
assembling a base package of the channel's content, wherein the base package contains each URL data item in the channel; and
assembling a delta package of the channel's content, wherein the delta package contains URL data items which have changed or are new since the previous assembling of the base package, and
wherein said step of assembling a delta package comprises the step of difference compressing a subset of the URL data items which are present in both the delta package and the previous base package.

31. The method of claim 26, further comprising the steps of:
assigning one or more multicast addresses to an announcement transmission, wherein the announcement transmission includes an announcement of an upcoming transmission of a channel's content; and
transmitting the announcement transmission to the receivers prior to transmitting the channel's content.

32. A method for transmitting content organized into channels, wherein a channel's content includes a plurality of URL data items and each URL data item is addressed by a URL, the method comprising the steps of:
scheduling the assembling of a channel's content;
assembling the channel's content according to the schedule;
compressing a subset of the URL data items, wherein each URL data item is compressed individually independent of other URL data items such that each compressed URL data item can be decompressed without decompressing other URL data items;
fragmenting the channel's content into packets;
multicasting the packets via a multicast network to a plurality of receivers;
wherein the step of assembling the channel's content comprises (a) assembling a base package of the channel's content, wherein the base package contains each URL data item in the channel, and (b) assembling a delta package of the channel's content, wherein the delta package contains URL data items which have changed or are new since the previous assembling of the base package, and
wherein said step of assembling the delta package comprises the step of difference compressing a subset of the URL data items in a channel's content which is present in both the delta package and the previous base package.

33. The method of claim 32, wherein the URL data items are compressed with a lossless data compression algorithm.

34. The method of claim 32, wherein the step of assembling the channel's content further comprises the steps of:
assembling a base package of the channel's content, wherein the base package contains each URL data item in the channel; and
assembling a delta package of the channel's content, wherein the delta package contains URL data items which have changed or are new since the previous assembling of the base package.

35. The method of claim 34, wherein the step of scheduling the assembling of the channel's content comprises scheduling the assembling of the base package and scheduling the assembling the delta package.

36. The method of claim 32, wherein the step of difference compressing further comprises the steps of:
dividing a URL data item in the delta package into sections; and
for each section, placing into a compressed version of the URL data item, one of a reference to where that section of content can be found in the base package, or the section of the URL data item from the delta package.

37. The method of claim 36, wherein the reference to where the section of URL data item can be found in the base package is an offset from a beginning of the URL to a first byte and an offset to a last byte being referenced.

38. The method of claim 32, further comprising the step of assembling a second delta package which contains a URL data item which has changed since the assembling of the previous delta package.

39. The method of claim 32, further comprising the step of encrypting a subset of a channel's packets prior to transmission, wherein either all or part of the packet are encrypted and wherein each channel's packets are encrypted with a set of encryption keys which are unique to that channel.

40. A method for transmitting content organized into channels, wherein a channel's content includes a plurality of URL data items and each URL data item is addressed by a URL, the system comprising:
assembling a base package of a channel's content, wherein the base package contains each URL data item in the channel;
multicasting the base package to a plurality of receivers;
assembling a delta package of a channel's content, wherein the delta package contains URL data items which have changed or are new since the previous assembling of the base package; and
multicasting the delta package to the plurality of receivers,
wherein said step of assembling a delta package comprises difference compressing a subset of the URL data items which are present in both the delta package and the previous base package.

41. The method of claim 40, further comprising the step of scheduling the assembling of base packages and delta packages, wherein the base packages and delta packages are assembled according to the schedule.

42. The method of claim 40, further comprising the step of scheduling the multicast transmission of base package packets and for scheduling subsequent periodic multicast transmission of delta package packets, wherein the base package packets and delta package packets are multicast according to the schedule.

43. The method of claim 42, wherein base package packets are scheduled for transmission at a time when the receiver is not likely to be in use for other applications.

44. The method of claim 40, further comprising the step of compressing a subset of the URL data items in the base and delta packages, wherein each URL data item is compressed individually independent of other URL data items such that each compressed URL data item can be decompressed without decompressing other URL data items.

45. The method of claim 44, wherein the URL data items are compressed with a lossless data compression algorithm.

46. The method of claim 40, wherein the step of difference compressing further comprises:
dividing a URL data item in the delta package into sections; and
for each section, placing into a compressed version of the URL data item, one of a reference to where that section can be found in the base package, or the section of the URL data item from the delta package.

47. The method of claim 46, wherein the reference to where the section of URL data item can be found in the base package is an offset from a beginning of the URL to a first byte and an offset to a last byte being referenced.

48. The method of claim 46, further comprising compressing a subset of the previously difference compressed URL data items with a lossless data compression algorithm.

49. The method of claim 40, further comprising the step of assembling a second delta package that contains URL data items that have changed since the assembling of the previous delta package.

50. A receiver for receiving from a multicast network content organized into channels, wherein a channel's content includes a plurality of URL data items and each URL data item is addressed by a URL, and wherein the multicast network transmits the channel's content to the receiver in packets, the receiver comprising:
    means for determining a multicast address used to carry a channel's packets;
    means for enabling reception of packets containing a channel's multicast address;
    means for receiving the packets containing a channel's multicast address;
    means for assembling the received packets into a channel's content;
    means for storing the channel's content as one file or a number of files less than the total number of URL data items in the channel; and
    means for allowing a user to access the stored channel's content.

51. The receiver of claim 50 wherein some of the received packets are wholly or partially encrypted and the receiver further comprises means for decrypting the encrypted packets using a decrypting key unique to the channel.

52. The receiver of claim 50, wherein the receiver is only authorized to receive selected packets.

53. The receiver of claim 50, wherein the channel's content is stored in a single file.

54. The receiver of claim 50, wherein the channel's content is stored in a number of files, and wherein the number of files is less than the total number of URL data items in the channel.

55. The receiver of claim 50, further comprising means for allowing the user to designate the channels to be received.

56. The receiver of claim 55, further comprising means for only receiving the user designated channels.

57. The receiver of claim 56, further comprising means for displaying to the user the set of channels which can be received.

58. The receiver of claim 57, further comprising means for receiving an electronic program guide channel, wherein the content of the electronic program guide channel includes channel selection information allowing the user to evaluate which channels the receiver should receive.

59. The receiver of claim 58, further comprising means for receiving updates for the electronic program guide channel.

60. The receiver of claim 58, wherein the channel selection information in the electronic program guide channel includes a schedule for when the content of the channels will be transmitted.

61. The receiver of claim 58, wherein the channel selection information in the electronic program guide channel includes an amount of memory space needed to store the channel's content.

62. The receiver of claim 50, further comprising means for determining whether all the packets for a channel have been received.

63. The receiver of claim 62, wherein the multicast network transmits packets to the receiver more than once and further comprising means for determining which packets for a channel were not received and assembling the channel's missing packets from the retransmitted packets.

64. The receiver of claim 50, wherein the receiver comprises a personal computer.

65. The receiver of claim 50, wherein the receiver comprises a set top box.

66. The receiver of claim 50, wherein the receiver is integrated with a digital television.

67. The receiver of claim 50, further comprising:
    means for determining when a URL data item requested to be accessed by the user is not present within the stored channel content,
    means for notifying the user that the requested URL data item is not present within the stored channel content, and
    means for allowing the user to access the non-present URL data item via a connection to a TCP/IP network.

68. The receiver of claim 67, wherein the TCP/IP network comprises the Internet.

69. The receiver of claim 68, wherein the multicast network is a geosynchronous satellite broadcast system and wherein the connection to the Internet is a dial-up modem.

70. The receiver of claim 67, further comprising means for soliciting the user whether to access the non-present URL data item via the connection to the TCP/IP network.

71. The receiver of claim 50, further comprising means for tracking each time the user accesses URL data items in the stored channel content.

72. The receiver of claim 71, further comprising means for reporting the tracked user accesses to a web site from which the accessed URL data items were assembled.

73. The receiver of claim 50, wherein the packet receiving means monitors receiver activity and selectively receives packets based on the monitored activity.

74. The receiver of claim 50, further comprising means for soliciting the user to determine when packets should be received and wherein the packet receiving means selectively receives packets based on user preferences.

75. A receiver for receiving from a multicast network content organized into channels, wherein a channel's content includes a plurality of URL data items and each URL data item is addressed by a URL, and wherein the multicast network transmits the channel's content to the receiver in packets, the receiver comprising:
    means for determining a multicast address used to carry a channel's packets;
    means for enabling reception of packets containing a channel's multicast address;
    means for receiving the packets containing a channel's multicast address;
    means for assembling the received packets into a channel's content;
    means for storing the channel's content as one file or a number of files less than the total number of URL data items in the channel;
    means for allowing a user to access the stored channel's content; and
    means for individually decompressing each compressed URL data item in the stored channel content at a time when the user accesses the URL data item.

76. The receiver of claim 75, wherein the URL data item is decompressed a first time the user access the URL data item and further comprising means for storing the decompressed URL data item.

77. The receiver of claim 75, wherein the URL data item is decompressed each time a user access the URL data item.

78. The receiver of claim 75, wherein the multicast network transmits a channel's content in base package packets and delta package packets, and the means for assembling the base package packets into a complete base package and assembling the delta package packets into a complete delta package.

79. The receiver of claim 78, wherein the means for storing the channel's content stores the complete base package for the channel and the complete delta package for the channel.

80. The receiver of claim 78, wherein the means for allowing a user to access the stored channel's content provides the user with a URL data item from a delta package when the URL data item is present in a delta package and provides the user a URL data item from a base package when the URL data item is not present in a delta package.

81. A receiver in a multicast system, comprising:

a package receiver for receiving packets containing URL data items from a multicast network and assembling the received packets into a channel, wherein the channel comprises a set of URL data items;

a memory for storing the channel as one file or a number of files less than the total number of URL data items in the channel; and a content viewer for allowing a user to request access to and access the URL data items in the stored channel.

82. The receiver of claim 81, further comprising a browser for searching the memory for URL data items requested by the user.

83. The receiver of claim 81, wherein the receiver comprises a personal computer.

84. The receiver of claim 81, wherein the receiver comprises a set top box.

85. The receiver of claim 81, wherein the receiver is integrated with a digital television.

86. The receiver of claim 81, wherein the packets received from the multicast network are encrypted and the package receiver decrypts the packets.

\* \* \* \* \*